United States Patent
Wei et al.

(10) Patent No.: US 8,670,439 B2
(45) Date of Patent: Mar. 11, 2014

(54) METHOD FOR ACCURATE DISTRIBUTION OF TIME TO A RECEIVER NODE IN AN ACCESS NETWORK

(75) Inventors: Dong Wei, Austin, TX (US); Guozhu Long, Fremont, CA (US); Jianhua Liu, Shenzhen (CN); Guijin Xu, Shenzhen (CN); Anni Wu, Shenzhen (CN)

(73) Assignee: Futurewei Technologies, Inc., Plano, TX (US)

( * ) Notice: Subject to any disclaimer, the term of this patent is extended or adjusted under 35 U.S.C. 154(b) by 189 days.

(21) Appl. No.: 13/175,697

(22) Filed: Jul. 1, 2011

(65) Prior Publication Data

US 2012/0020417 A1 Jan. 26, 2012

Related U.S. Application Data

(60) Provisional application No. 61/361,259, filed on Jul. 2, 2010.

(51) Int. Cl.
*H04W 56/00* (2009.01)

(52) U.S. Cl.
USPC .......................................... 370/350; 709/248

(58) Field of Classification Search
None
See application file for complete search history.

(56) References Cited

U.S. PATENT DOCUMENTS

| | | | | |
|---|---|---|---|---|
| 2002/0034196 A1* | 3/2002 | Tzannes | ......................... | 370/529 |
| 2007/0109974 A1* | 5/2007 | Cutillo et al. | .................. | 370/254 |
| 2008/0298444 A1* | 12/2008 | Cioffi et al. | ..................... | 375/222 |
| 2009/0034672 A1* | 2/2009 | Cho et al. | ....................... | 375/364 |
| 2009/0174691 A1* | 7/2009 | Yeo | ................................ | 345/204 |
| 2010/0080210 A1* | 4/2010 | Kim | ............................... | 370/350 |
| 2010/0086091 A1 | 4/2010 | Park et al. | | |
| 2010/0115047 A1* | 5/2010 | Briscoe et al. | ................ | 709/208 |
| 2010/0329387 A1* | 12/2010 | Watanabe | ...................... | 375/296 |
| 2011/0170583 A1* | 7/2011 | Polaert et al. | .................. | 375/224 |
| 2011/0286560 A1* | 11/2011 | Pignatelli | ...................... | 375/356 |

FOREIGN PATENT DOCUMENTS

WO 2009/147029 A1 12/2009

OTHER PUBLICATIONS

Bui, D., Ed., et al., "M2.4 Synchronization Service in Carrier-Grade Ethernet Environments," TIGER 2—Together IP, GMPLS, and Ethernet Reconsidered Phase 2, Feb. 25, 2010, 1-52 pages.

Kihara, M., et al., "System Configuration for Standardizing SDH-Based Time and Frequency Transfer," Proceedings of the European Frequency and Time Forum, Jan. 1, 1996, pp. 465-470.

Foreign Communication From a Related Counterpart Application, PCT Application PCT/US2011/042858, International Search Report dated Nov. 21, 2011, 5 pages.

Foreign Communication From a Related Counterpart Application, PCT Application PCT/US2011/042858, Written Opinion dated Nov. 21, 2011, 11 pages.

(Continued)

*Primary Examiner* — Chi Pham
*Assistant Examiner* — Raul Rivas
(74) *Attorney, Agent, or Firm* — Conley Rose, P.C.; Grant Rodolph; Rayhao Chung

(57) ABSTRACT

An apparatus comprising a customer node configured to couple to an access node and to receive via a channel from the access node a time of day (TOD) value and a corresponding sample index (SNUM) value, wherein the TOD value and the SNUM value are used to estimate a second time of day (TOD') value based on a propagation delay of the channel (L-Delay), and wherein the TOD value and the TOD' value are used to estimate a second SNUM value (SNUM') based on L-Delay and a plurality of parameters.

22 Claims, 20 Drawing Sheets

(56) References Cited

OTHER PUBLICATIONS

"Series G: Transmission Systems and Media, Digital Systems and Networks, Digital Sections and Digital Line System-Access Networks, Asymmetric Digital Subscriber Line Transceivers 2 (ADSL2)," ITUT G.992.3, Apr. 2009, 404 pages.

"Series G: Transmission Systems and Media, Digital Systems and Networks, Digital Sections and Digital Line System-Access Networks, Asymmetric Digital Subscriber Line Transceivers 2 (ADSL2), Annex C: Specific Requirements for an ADSL System Operating in the Same Cable as ISDN as defined in Appendix III of Recommendation ITU-T G.961," ITUT G. 992.3 Annex C, Apr. 2009, 296 pages.

"Series G: Transmission Systems and Media, Digital Systems and Networks, Digital Sections and Digital Line System-Access Networks, Asymmetrical Digital Subscriber Line Transceivers 2 (ADSL2)—Extended Bandwidth (ADSL2plus)," ITUT G. 992.5, Jan. 2009, 110 pages.

"Series G: Transmission Systems and Media, Digital Systems and Networks, Digital Sections and Digital line System-Access Networks, Asymmetric Digital Subscriber Line Transceivers 2 (ADSL2)—Extended Bandwidth (ADSL2plus), Annex C: Specific Requirements for an ADSL System Operating in the Same Cable as ISDN as Defined in Appendix III of Recommendation ITU-T G.961," ITUT G. 992.5 Annex C, Jan. 2009, 66 pages.

"Series G: Transmission Systems and Media, Digital Systems and Networks, Digital Sections and Digital Line System-Access Network, Very High Speed Digital Subscriber Line Transceivers 2 (VDSL2)," ITUT G. 993.2, Feb. 2006, 252 pages.

"G.VDSL: Method for Transporting Time-of-Day in VDSL2 Systems," Study Group 15 Contribution 812, May 2010, 4 pages.

"G.VDSL: Method for Phase Synchronizing VDSL Local Clocks in Support of ToD Transport," Study Group 15 Contribution 813, May 2010, 4 pages.

"IEEE Standard for a Precision Clock Synchronization Protocol for Networked Measurement and Control Systems, IEEE Instrumentation and Measurement Society," IEEE 1588, Jul. 24, 2008, 289 pages.

\* cited by examiner

METHOD FOR ACCURATE DISTRIBUTION OF TIME TO A RECEIVER NODE IN AN ACCESS NETWORK

CROSS-REFERENCE TO RELATED APPLICATIONS

The present application claims the benefit of U.S. Provisional Patent Application No. 61/361,259 filed Jul. 2, 2010 by Dong Wei et al. and entitled "Method for Accurate Distribution of Time," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Mobile communication services are becoming more popular among customers around the world. Services such as Video On Demand (VOD), Triple Play, and other mobile services require higher bit rate than traditional services, such as voice service. The higher demanding services may be guaranteed using relatively high quality and stable digital links, e.g., that provide relatively high level Quality of Service (QOS) and high bit rate. To achieve such requirements, Base Stations (BSs) for wireless systems may be placed indoors instead of outdoors to reduce the signal transmission length in the air. Such a scheme may also substantially increase the quantity of deployed BSs. To meet the trend above, access networks that act as mobile backhaul may take some part in carrying data flows of indoor mobile services. Examples of access networks include digital subscriber line (DSL) systems and passive optical networks (PONs). Carrying some data flows from indoor BSs, also referred to as micro BSs, may reduce network cost. Such approach may also require improved time/frequency synchronization for mobile backhaul, for example in accordance with the Institute of Electrical and Electronics Engineers (IEEE) standard 1588, which is incorporated herein by reference.

SUMMARY

In one embodiment, the disclosure includes an apparatus comprising an access node configured to couple to a receiver node and send a relative Time-of-Day (TOD) value to the receiver node, wherein the relative TOD value is used to adjust the frequency of a clock in the customer node with a relative TOD' value, and/or further adjust the time of the clock in the receiver side with the TOD value and the propagation delay of the link L-Delay to synchronize with the clock in the access node.

In another embodiment, the disclosure includes a network component comprising a clock in an access node updated by a network clock signal, e.g., a network timing reference (NTR) signal or a time-of-day signal from the network, and configured to provide a TOD value when a signal transmitting to the customer node arrives at a reference point at the access node side and/or further obtain a relative TOD value, wherein the relative TOD value is a value of the TOD value modulo a fixed value (e.g., 125 microseconds).

In yet another embodiment, the disclosure includes a method comprising receiving a TOD value and/or a relative TOD value, obtaining a TOD' value when the same signal taken the TOD value arrives at the reference point at the customer node and/or further obtaining a relative TOD' value, wherein the relative TOD' value is a value of the TOD' value modulo a fixed value (e.g., 125 microseconds), adjusting the frequency of a second clock in the customer node with the received value and the obtained value, and/or further adjusting the time of the second clock in the customer node with the received TOD value and the propagation delay of the link L-Delay to synchronized with the clock maintained at the access node.

In one embodiment, the disclosure includes an apparatus comprising a customer node configured to couple to an access node and to receive via a channel from the access node a time of day (TOD) value and a corresponding sample index (SNUM) value, wherein the TOD value and the SNUM value are used to estimate a second TOD (TOD') value based on a propagation delay of the link (L-Delay), and wherein the TOD value and the TOD' value are used to estimate a second sample index (SNUM') value based on L-Delay and a plurality of parameters.

In another embodiment, the disclosure includes a network component comprising a counter configured to provide a SNUM value that corresponds to a pulse of a pulse per second (PPS) signal, a clock configured to provide a TOD value that indicates a time instant when a signal is transmitted at a reference point, and a transmitter configured to transmit the SNUM value and the TOD value on a twisted copper line.

In yet another embodiment, the disclosure includes a method comprising receiving a TOD value and a corresponding SNUM value, obtaining a TOD' value based on a propagation delay, obtaining a SNUM' value based on the TOD value, the TOD' value, the SNUM value, and a plurality of transmission parameters, and generating a PPS' signal pulse using an adjusted clock based on the TOD' value and the SNUM' value.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
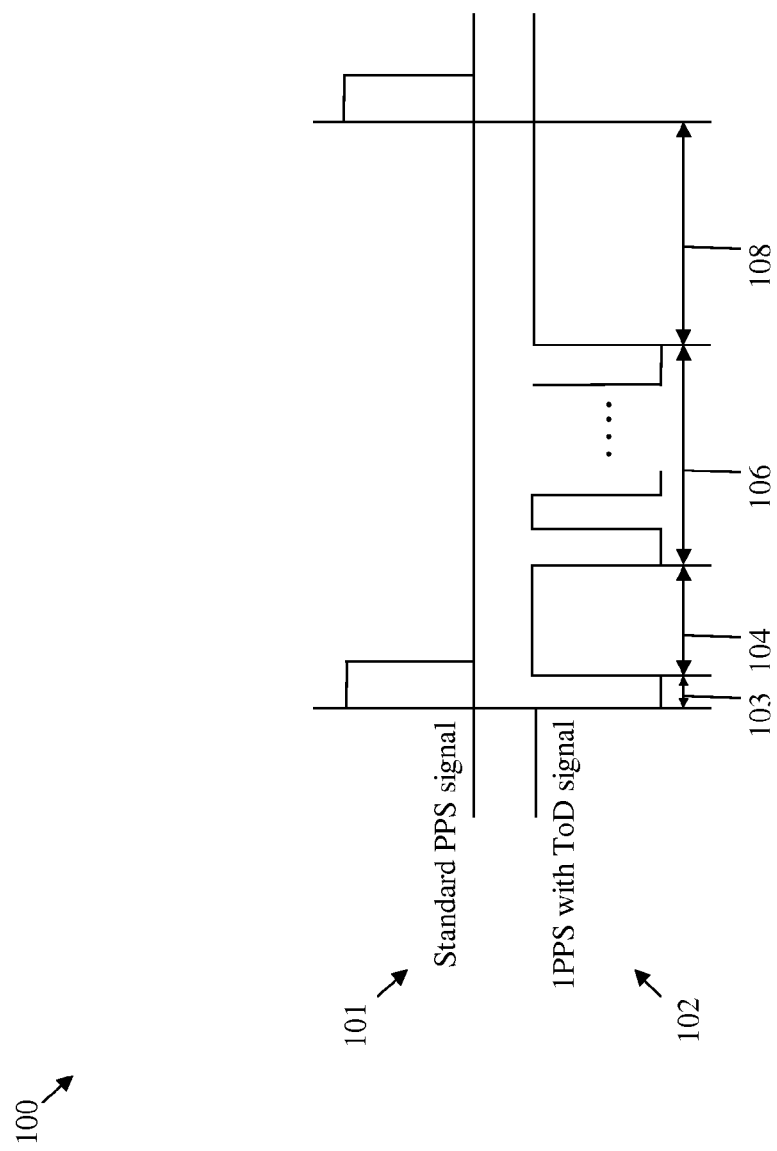
FIG. 1 is a schematic diagram of an embodiment of a PPS signal.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

A general packet based technique has been proposed for accurate time distribution for the network, e.g. as described in IEEE standard 1588v2 that is incorporated herein by reference, which uses a two-way methodology based on a symmetric delay assumption for links. The clock is carried in an upper layer packet that may be distributed to all connected base stations. Using IEEE 1588v2 at the upper layer requires substantially high symmetry between downstream and upstream delays and relatively low delay jitters in both directions. However, the physical layer may belong to a DSL system where the delay between downstream (i.e., from a central office (CO) to a customer premises equipment (CPE)) and upstream (i.e., from CPE to CO) is asymmetric and unstable jitters in milliseconds may be introduced. This makes is difficult to achieve accurate time distribution over the DSL links with the packet based technique, e.g. as in IEEE 1588v2. Further, if frequency synchronization between the clocks at the CO and the CPE is poor, then a time synchronization procedure may be needed even more frequently, and hence more system resources may be required. The precision of frequency synchronization achieved by a network timing reference (NTR) mechanism defined in ITU-T recommendation (e.g., G.992.3, G.992.5, and G.993.2 that are all incorporated herein by reference), which is used in the current DSL system, may not meet the precision of frequency synchronization required by the mobile network. A frequency synchronization technique with high accuracy is needed.

Disclosed herein is a system and method for providing substantially accurate frequency/time distribution for access networks, such as DSL systems or PON systems, which may act as mobile backhaul. The method may be used to reduce or eliminate degradation in frequency/time distribution due to channel or propagation delay, deviation or offset of sampling clock frequency, and symbol alignment error. The system and method may be suitable for the system with asymmetric link delays and jitters, e.g., DSL systems.

The method may comprise obtaining a sample index value denoted by SNUM when a pulse of a PPS signal is detected, sending the samples index SNUM value and a corresponding TOD value obtained by using the clock at an access node (e.g., a CO) to a customer node (e.g. a CPE). The values may be then received by a customer node, and used to obtain an estimated TOD' value, considering a propagation delay of the link between the access node and the customer node denoted by L-Delay. Subsequently, a corresponding SNUM' value may be obtained based on the TOD and TOD' values, a sampling clock time interval or period ($T_s$), a propagation delay, and a symbol alignment error (Δsym-align). A recovered clock at the customer node may be adjusted by processing the SNUM' and TOD' at the customer node so that the adjusted clock at the customer node is frequency/time synchronized with the clock at the access node. The recovered PPS signal at the customer node denoted by PPS' signal, which is the output of the clock at the customer node, is adjusted by processing the SNUM' and TOD', which may be sufficiently accurate to meet frequency/time distribution and synchronization requirements for mobile backhaul.

Furthermore, the method may comprise sending a TOD value or a relative TOD value from an access node, e.g., a CO, where the TOD value and the relative TOD value indicate the time instant and the relative time instant, respectively, when a specified signal is transmitted over a specified location at the access node (e.g., a U-O reference point or the output of the IDFT for DSL system). The TOD value and the relative TOD value may be obtained using the clock at the access node which is synchronized with a network clock and updated by a PPS signal. The clock at the customer node may be adjusted with the received value to be frequency/time synchronized with the clock at the access node. If a relative TOD value is sent, then the clock at the customer node may be adjusted to the same relative TOD value when the same specified signal is received over the same location (e.g., a U-R reference point or the input of the DFT for DSL system) at the customer node so that the adjusted clock is frequency synchronized with the clock at the access node. A relative TOD value is a time expressed as a value relative to a specified signal from a third party that may be received by both the access node and the customer node. If a TOD value is sent, then the clock at the customer node may be adjusted based on the received TOD value and a propagation delay L-Delay to be frequency/time synchronized with the clock at the access node. The recovered PPS signal at the customer node denoted by PPS' signal is adjusted by the adjusted clock. Other methods and details for calculating the various values above and other related parameters are described further below.

FIG. 1 illustrates an embodiment of a PPS signal 100. The PPS signal 100 may be transmitted on a time-of-day interface based on a serial port communication method to update a clock at an access node to provide the TOD information for communication systems (e.g., a DSL system). The PPS signal and a corresponding Time-of-Day information may be both sent on the same channel, e.g., using the same interface, port, or pin. The PPS signal and a corresponding ToD information may be sent in a 1PPS with ToD signal 102 that represents a type of PPS signal. The 1PPS with ToD signal 102 may be transmitted at about 1,000,000 Hertz (Hz). The descending edge of 1PPS with ToD signal 102 is aligned with the rising edge of a Standard PPS signal 101. When Time-of-Day information is carried on the PPS signal, the PPS signal 102 may comprise a PPS segment 103, a waiting segment 104, a serial information segment 106, and an idle segment 108. The Time-of-Day information may be carried in the serial information segment 106 to indicate the time instant of the descending edge of the PPS signal transmitted in segment 103 of the current PPS cycle. The PPS signal 102 may comprise about one start bit and about one stop bit, and may not comprise checksum bits. Low-voltage Transistor-transistor logic (LVTTL) may be used to transmit the 1PPS with ToD signal 102.

Figure 2:
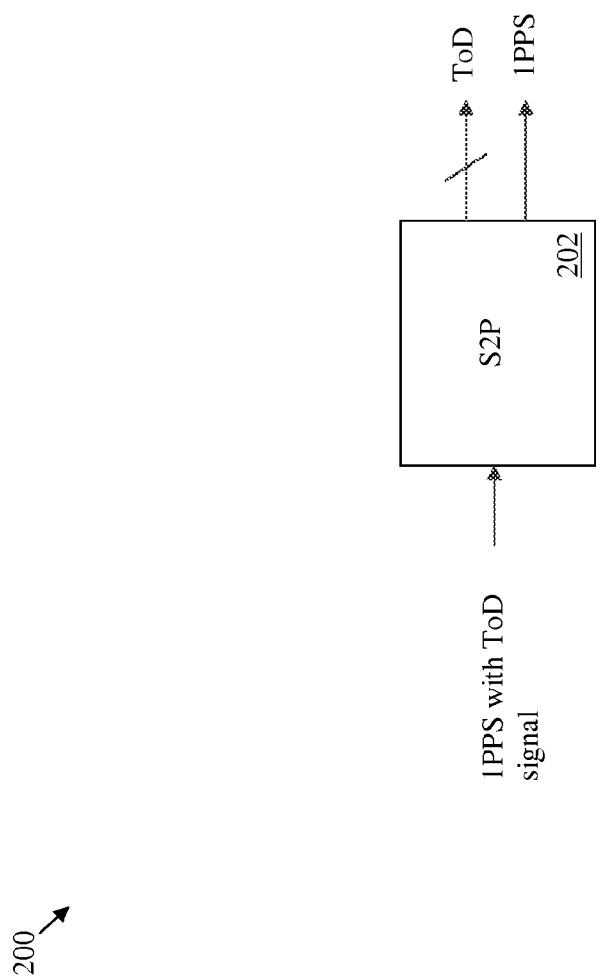
FIG. 2 is a schematic diagram of an embodiment of a PPS with TOD signal separation.

FIG. 2 illustrates an embodiment of a PPS with ToD signal separation 200, which may be implemented at an access node, e.g., a CO. For the flexibility of the system, the PPS with ToD signal from the external clock resource may be separated into PPS signal and ToD information. The PPS with ToD signal separation 200 may be used to receive a PPS signal carrying the Time-of-Day (ToD) information on a single channel or interface, extract the PPS signal and ToD information, and forward them over different interfaces or ports. The PPS and ToD signal separation 200 may use a S2P module splitter 202 that is configured to transform a PPS with ToD serial signal into two parallel PPS and ToD signals, which may be each forwarded on a separate channel. The PPS signal is at least a 1PPS signal, i.e., one pulse per second. The PPS signal may be used to update a clock at an access node.

Figure 3:
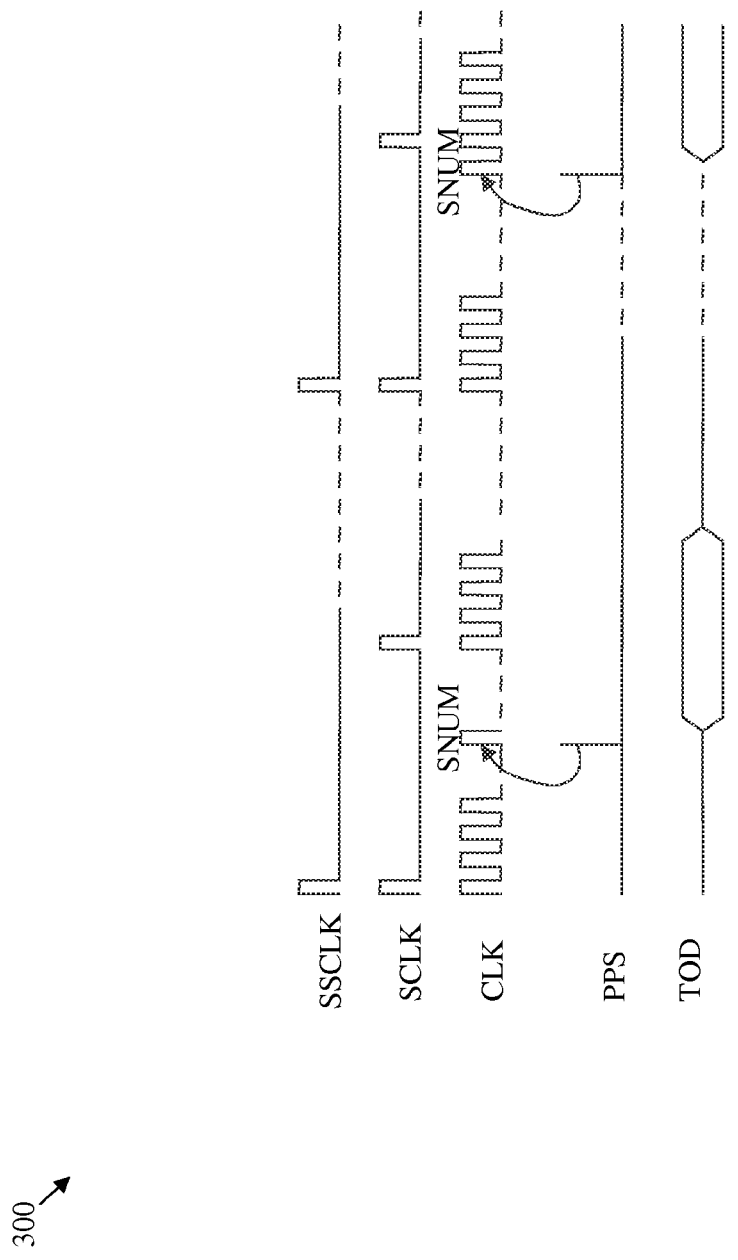
FIG. 3 is a schematic diagram of an embodiment of reference points and corresponding sample indexes SNUM generation.

FIG. 3 illustrates an embodiment of reference points and corresponding sample indexes SNUM generation 300, which may be implemented at an access node, e.g., a CO. The reference points and corresponding sample indexes SNUM generation 300 may generate a sample index SNUM when each or specified pulse of PPS signal (e.g., the descending edge of the 1PPS with ToD signal 102 shown in FIG. 1) is detected. For each pulse of PPS signal, i.e., the beginning of each PPS cycle, that appears at the CO, the CO may record a sample index SNUM value based on a location counter that may be maintained in the system. For instance, the location counter may comprise a plurality of counters for Sync Symbol Counter (SSCLK), Symbol Counter (SCLK), and Sample Counter (CLK). The CLK counter counts the number of the sample in a Discrete Multi-Tone (DMT) symbol transmitted by the access node. The SCLK counter counts the number of the symbols transmitted by the access node during two adjacent sync symbols of Showtime. The SSCLK counter counts the number of the sync symbol during the Showtime. The SNUM value may be obtained according the value of the location counter at the time instant when a pulse of PPS signal is detected at the access node, as shown in FIG. 3.

Figure 4:
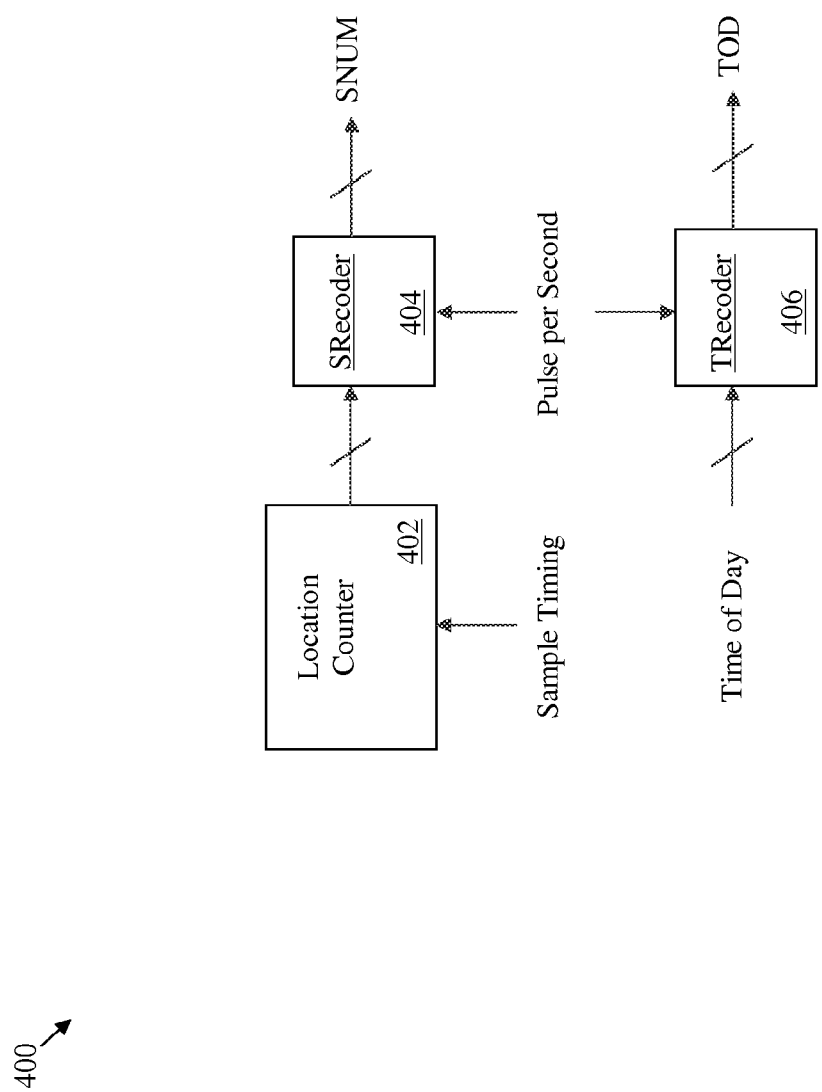
FIG. 4 is a schematic diagram of an embodiment of SNUM and TOD generation.

FIG. 4 illustrates an embodiment of a SNUM and TOD generation 400, which may be implemented at an access node, e.g., a CO. The SNUM and TOD generation 400 may be based on the reference points and the corresponding sample indexes SNUM generation 300. For instance, when a DSL system (e.g., ADSL2, ADSL2+, VDSL2) enters the Showtime, a Location Counter 402 at the CO may begin to count the number of the samples transmitted by the access node according the sampling clock. The Location Counter 402 may comprise a SSCLK counter, a SCLK counter, and/or a CLK counter, as described above. When a pulse is detected, the value of the Location Counter 402 denoted by SNUM may be recorded by a SRecoder 404 in the system. The SNUM value may then be transmitted via a transmitter to a receiver, e.g., a CPE, via an Embedded Operations Channel (EOC) or an Overhead (OH) frame. Additionally, at the same time (i.e., when a pulse is detected), a TOD value may be recorded by a TRecorder 406 to indicate the time instant when the current pulse is detected, and is then sent on a transmitter to a receiver via an EOC or an OH frame. The TRecorder 406 may obtain the TOD value using a clock at the access node. The clock may be synchronized with the PPS signal and updated by the PPS signal. The TOD value may be sent in the same EOC message or the same OH frame with the SNUM value.

Figure 5:
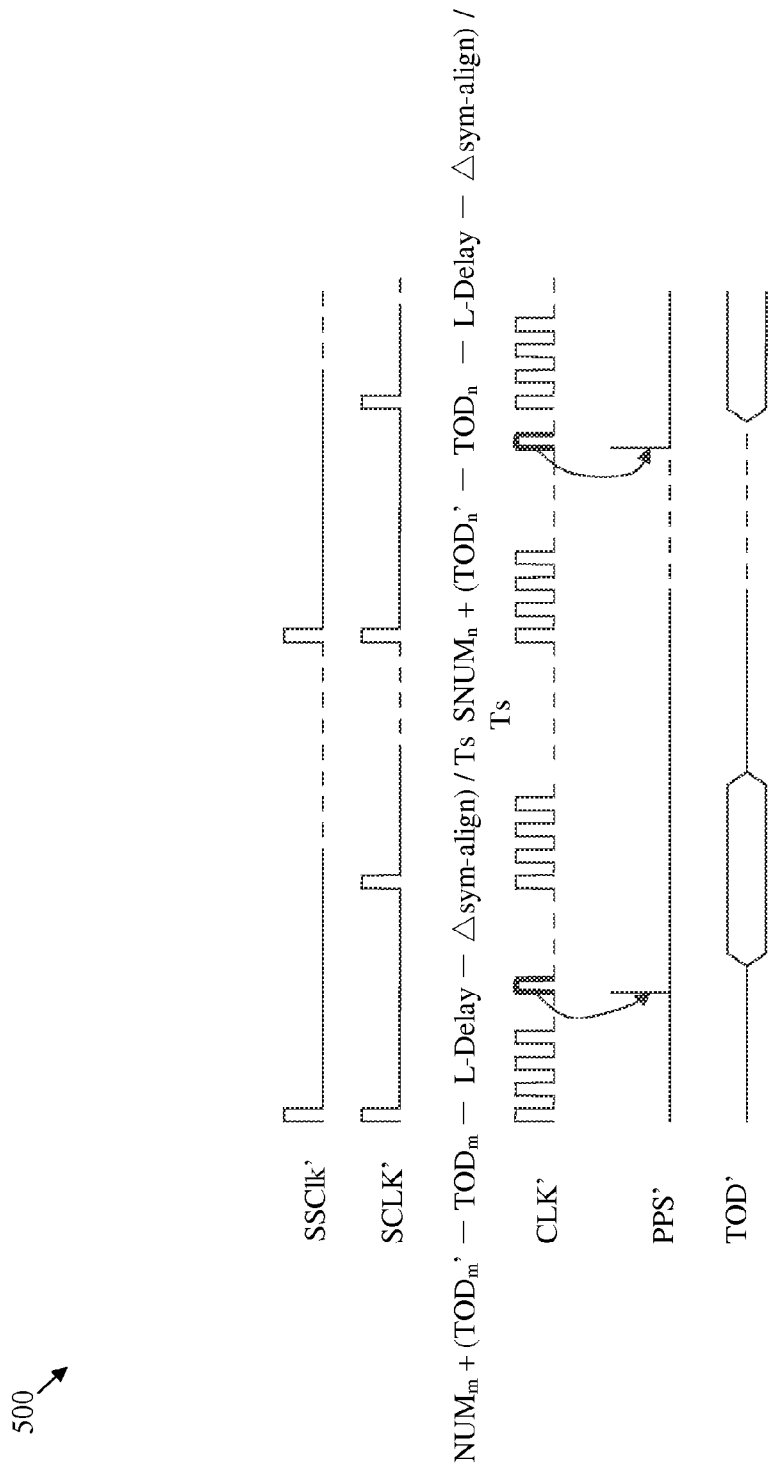
FIG. 5 is a schematic diagram of an embodiment of a PPS signal recovery.

FIG. 5 illustrates an embodiment of a PPS signal recovery 500, which may be implemented by a customer node (e.g., a CPE). The PPS signal recovery 500 may adjust a recovered PPS signal denoted by a PPS' signal with a SNUM value and/or a TOD value received by the CPE. The recovered PPS signal may provide the Time-of-Day information to the other equipment. A location counter may be maintained at the CPE which is synchronized with the location counter at the CO side. The location counter at the CPE may comprise a SSCLK' counter, a SCLK' counter, and/or a CLK' counter. The SSCLK' counter records the number of the received sync symbols during the Showtime at the CPE. The SCLK' counter records the number of the received symbols between two adjacent sync symbols during the Showtime at the CPE. The CLK' counter records the number of the received samples in one DMT symbol during Showtime at the CPE. When a SNUM value and the corresponding TOD value are received at the CPE, a time instant TOD' may be estimated by the CPE. The TOD' value indicates the time instant of the beginning of the next PPS cycle of the recovered PPS signal (such as a pulse of 1PPS signal shown in FIG. 1). Typically, the time difference between the TOD value and the corresponding TOD' value may be larger than the EOC channel transmission time due to other system delays in addition to the propagation delay of the link. The PPS signal recovery 500 may account for a plurality of degradations in time distribution, such as due to propagation delay, deviation of sampling clock frequency, and symbol alignment error, to improve the precision of the recovered PPS' signal at the CPE.

Specifically, a corresponding SNUM' value may indicate the index of the sample received by the CPE at the TOD' value. The estimation of the SNUM' value may be based on the received SNUM value, the received TOD value, the estimated TOD' value, the propagation delay of the link, and/or a symbol alignment error as follows:

$$\text{SNUM}+(\text{TOD}'-\text{TOD}-\text{L-Delay}-(\Delta\text{sym-align})/T_s, \quad (1)$$

or as follows:

$$(\text{TOD}'-\text{L-Delay}-\Delta\text{sym-align})/T_s, \quad (2)$$

wherein, L-Delay is the propagation delay of the link from the CO to the CPE, which may typically depend on the loop length, digital circuit, and analog circuit; Δsym-align is a symbol alignment error; and $T_s$ is the period of the sample transmitted by the access node.

The adjusted PPS' signal outputs a pulse when the sample with SNUM' is received by the CPE. The recovered PPS signal (i.e., PPS' signal) may be adjusted by the CPE based on the SNUM' value and TOD' value so that the adjusted PPS' signal is frequency/time synchronized with the PPS signal at the access node.

Alternatively, a clock may be maintained at the CPE. The clock may be updated by the CPE with the estimated TOD' value and the SNUM' value. The clock may output the recovered PPS' signal. The clock may output a pulse of the recovered PPS' signal with the TOD' information when the SNUM' sample is received by the CPE.

The sampling clock at the CPE may be synchronized with the sampling clock at the CO by loop timing. However, an accumulated offset may be introduced by the oscillators to generate the sampling clocks at the CO and CPE. The oscillator is usually in parts per million (PPM) so that the deviation may be in milliseconds. This may increase the error of estimating the TOD' to hundreds of nanoseconds. For example, if the oscillator is about 20 PPM and the difference between the TOD' and the TOD is equal to about 20 milliseconds, the error of estimating the TOD' value may be about 400 nanoseconds. This may not be acceptable for the precision of time/frequency synchronization for mobile network. To reduce or eliminate the error, a substantially accurate sampling clock frequency or period estimation may be needed.

Figure 6:
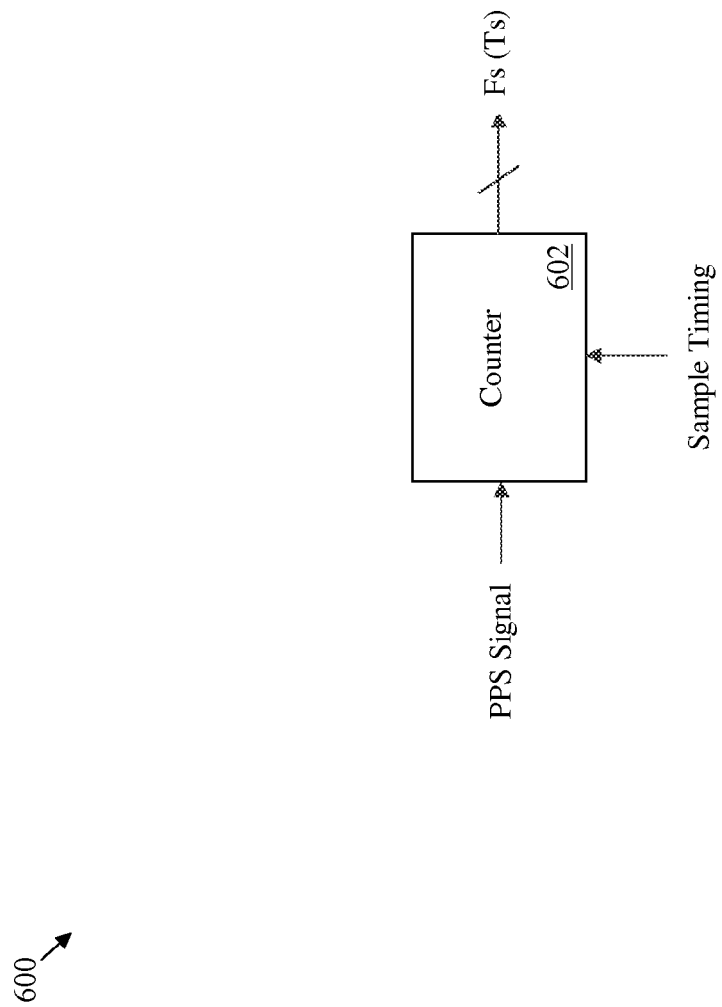
FIG. 6 is a schematic diagram of an embodiment of a sampling clock period estimation.

FIG. 6 illustrates an embodiment of a sampling clock period estimation 600, which may be implemented in an access node, e.g., a CO. The sampling clock period estimation 600 may use a counter 602 at the CO to count the number of the sampling clock cycle between two adjacent PPS cycles to obtain a substantially accurate sampling clock frequency ($F_s$) or period ($T_s$). The $F_s$ or $T_s$ value may then be transmitted to the CPE over an EOC or an OH frame. This substantially accurate $F_s$ or $T_s$ estimation may be used in equation (1) to eliminate or substantially reduce the accumulated offset error.

In another embodiment, to remove the uncertainty or inaccuracy in the $F_s$ or $T_s$ value, the CO sampling clock may be synchronized with a NTR. The NTR may be synchronized with the original network clock. The CO sampling clock synchronized with NTR may be substantially accurate and stable. In this case, the value of $F_s$ is the frequency of the sampling clock. This scheme may further improve the precision of the estimated SNUM' value with equation (1).

Figure 7:
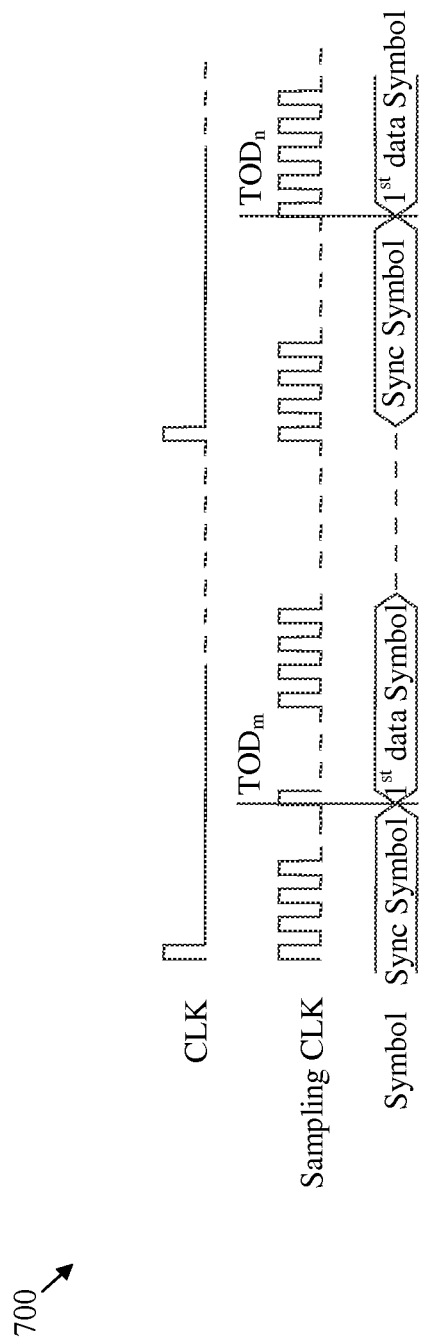
FIG. 7 is a schematic diagram of an embodiment of reference points and corresponding TOD generation.

FIG. 7 illustrates an embodiment of reference points and corresponding TOD generation 700, which may be implemented at an access node, e.g., a CO. The reference points and corresponding TOD generation 700 may generate a time instant TOD at the CO when a specified sample is transmitted by the access node. The TOD may be obtained according to a clock at the CO. The clock may be synchronized with the network clock external to the CO, e.g., the original network clock, via a NTR signal or a time-of-day signal (e.g., 1PPS signal shown in FIG. 1). The clock may be updated by the network clock signal, e.g., a NTR signal or a time-of-day signal. For DSL systems, the specified sample may be the $N^{th}$ sample of a specified symbol, e.g., the first time domain sample. The specified symbol may be the $M^{th}$ symbol for each time unit after the CO enters Showtime or the $L^{th}$ symbol of each super frame during the Showtime, e.g., the first data symbol of each super frame or the sync symbol during the Showtime.

When the specified sample (e.g., the first time-domain sample of the first data sample of each super frame) is transmitted, a time instant TOD may be obtained by the CO according the clock maintained at the CO side. The TOD value may be obtained when the specified sample arrives at the output of the Inverse Discrete Fourier Transform (IDFT) of the CO or at the U-O reference point at the CO side. If the TOD value is obtained when the specific sample arrives at the U-O reference point, then the propagation delay of the link L-Delay may be the propagation delay of the twisted pair, i.e., the propagation delay from a U-O reference point to a U-R reference point. The specified sample may be known by the CO and the CPE and thus the reference sample index for obtaining the TOD value may not be sent from the CO to the CPE. The CO may send the TOD value to the CPE via an EOC message or an OH frame. Alternatively, the TOD value sent to the CPE may be a relative value. The TOD value may indicate the time difference between a reference signal and the time instant when the specified sample is transmitted by the CO. The reference signal may be the previous nearest pulse of the PPS signal or the previous nearest pulse of the NTR signal. Alternatively, the TOD value may be recorded as the time instant modulo a fixed value. The time instant may be obtained as above. The fixed value may be about 125 microseconds, or a multiple of about 125 microseconds.

Figure 8:
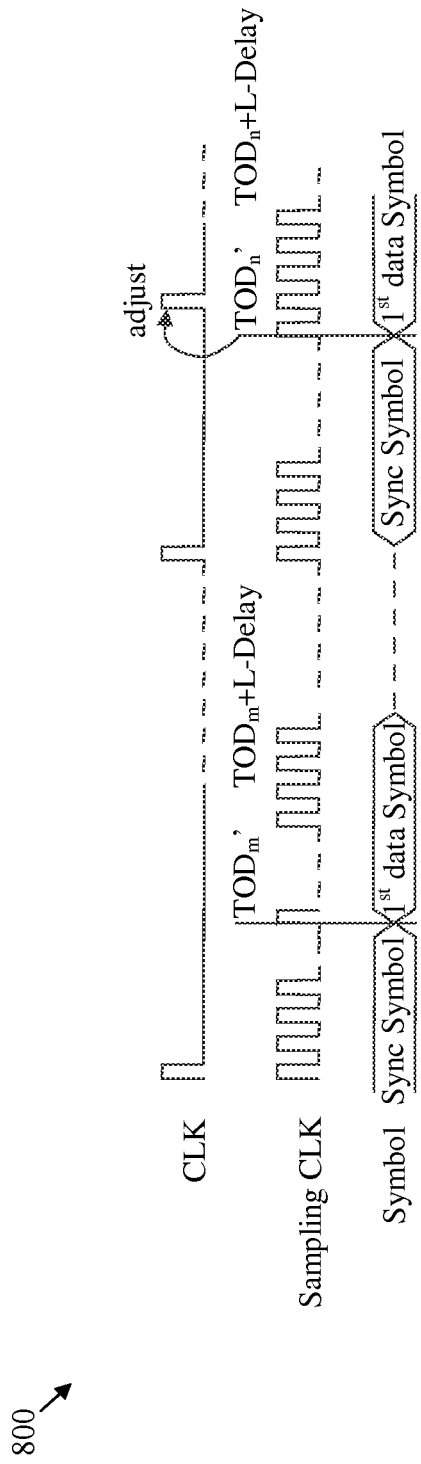
FIG. 8 is a schematic diagram of an embodiment of frequency/time synchronization generation with TOD value.

FIG. 8 illustrates an embodiment of frequency/time synchronization generation with TOD value 800, which may be implemented at a customer node, e.g., a CPE. The frequency/time synchronization generation with TOD value 800 may obtain a TOD' value when the same reference sample (i.e., the reference sample which the TOD value obtained by the CO) is received by the CPE, calculate the time instant with the received TOD value and the propagation delay of the link L-Delay, and adjust the frequency/time of the clock maintained by the CPE. The adjusted clock at the CPE side may be frequency/time synchronized with the clock maintained at the CO side so that the adjusted clock at the CPE side may be frequency/time synchronized with the network clock. The TOD value may be obtained as shown in FIG. 7. The TOD' value may be obtained by the CPE with similar location as the CO obtained, i.e., when the same reference sample arrives at the input of the Discrete Fourier Transform (DFT) or at the U-R reference point at the CPE side. If the TOD and TOD' values are obtained at the U reference point, then the propagation delay of the link is the propagation delay from the U-O reference point to the U-R reference point. The frequency/time synchronization generation with TOD value 800 may calculate the time instant TIME with the TOD value and the propagation delay, and then adjust the clock at the CPE from TOD' to TOD+L-Delay so that the clock at the CPE is frequency/time synchronized with the clock at the CO. The recovered PPS' signal output from the adjusted clock may be frequency/time synchronized with the PPS signal input to the access node, e.g., the 1PPS signal shown in FIG. 1.

Figure 9:
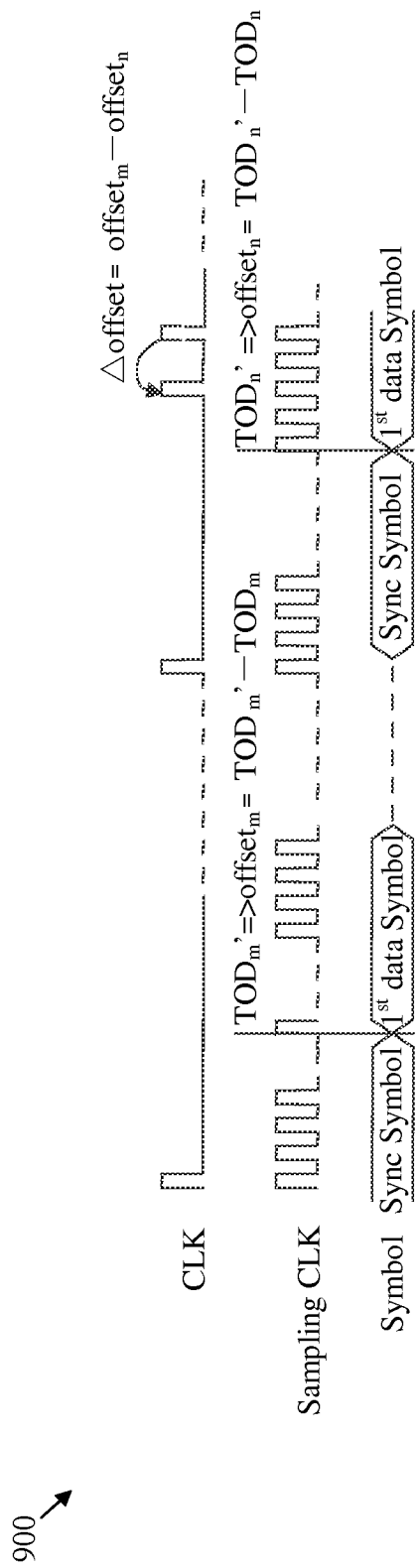
FIG. 9 is a schematic diagram of an embodiment of frequency synchronization generation with relative TOD value (a relative time).

FIG. 9 illustrates an embodiment of frequency synchronization generation with relative TOD value 900, which may be implemented at a customer node, e.g., a CPE. The frequency/time synchronization generation with relative TOD value 900 may obtain a time instant when the same reference sample (i.e., the reference sample which the TOD value obtained by the CO) is received by the CPE, and change the time instant to a relative value TOD' as shown in FIG. 7. The frequency/time synchronization generation with relative TOD value 900 may calculate the change in the offset between the relative TOD' value and the relative TOD value from the previous super frame period to the present super frame period, and then adjust the frequency of the clock at the CPE side with the change in the offset so that the clock in the CPE may be frequency synchronized with the clock in the CO. If the time instant obtained when the reference sample transmitted by the CO is received by the CPE, then the frequency synchronization generation with relative TOD value 900 may further adjust the clock maintained at the CPE to the time/frequency synchronized with the clock at the CO. The clock may output a recovered PPS' signal to the time/frequency synchronized with the PPS signal input to the DSL system from the network clock.

Figure 10:
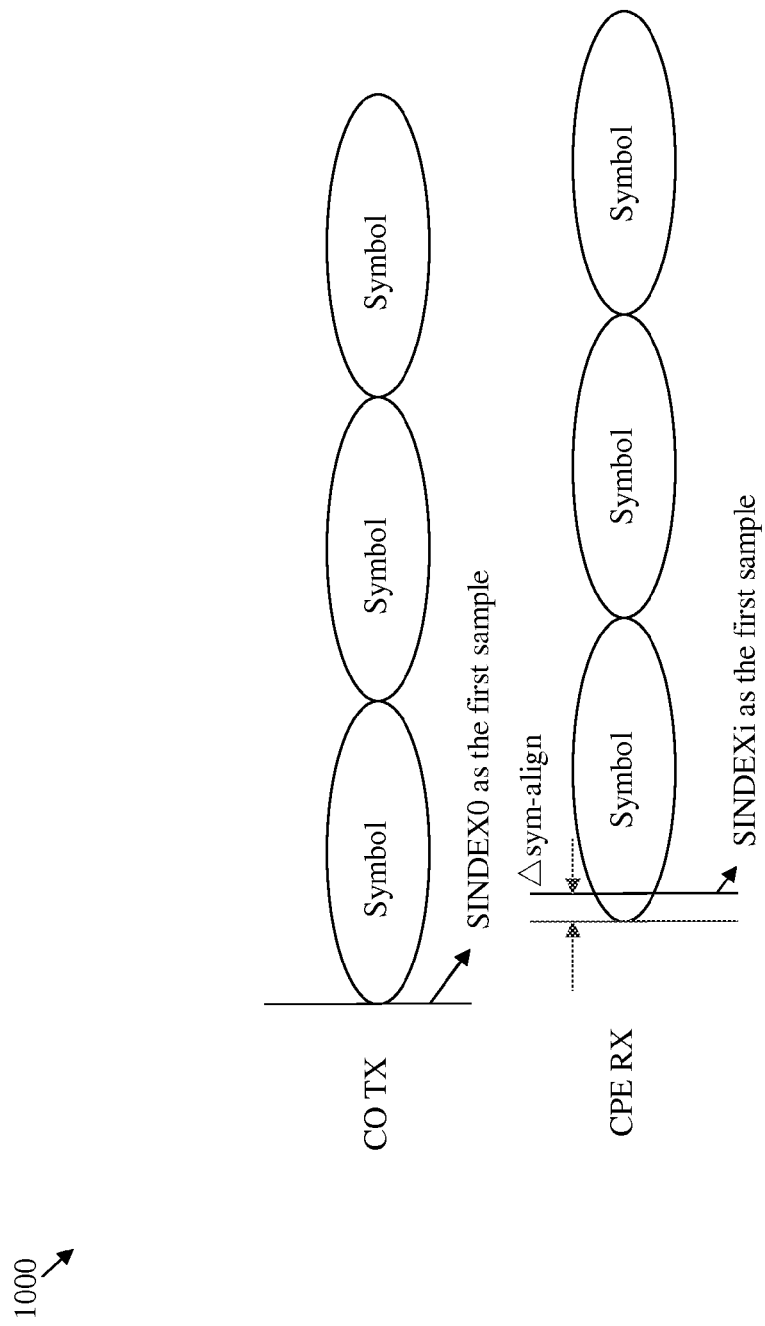
FIG. 10 is a schematic diagram of an embodiment of a symbol alignment error.

FIG. 10 illustrates an embodiment of a symbol alignment error 1000 (Δsym-align), which may occur at a customer node, e.g., a CPE. The symbol alignment error 1000 may occur in Discrete Multi-Tone (DMT) symbol or frame transmission in DSL systems that use DMT modulation, such as in ADSL, ADSL2, ADSL2plus, and VDSL2 systems. A DSL receiver at the CPE may detect the boundary of the DMT frame and implement symbol timing or a symbol alignment algorithm to lock the start of a received symbol sequence. Symbol alignment algorithms may introduce error in addition to the precision error due to the limited sample rate. The resulting symbol alignment error 1000 (Δsym-align) may influence the accuracy of clock synchronization. As shown in FIG. 10, a CO transmitter may transmit a sequence of symbols that start with a first symbol, referred to as SINDEX0. When the CPE receives the sequence of symbols, the CPE may lock another symbol, referred to as SINDEXi, subsequent to SINDEX0 as the first symbol in the sequence instead of SINDEX0. The difference between SINDEXi and SINDEX0 may correspond to Δsym-align and may be caused by the accuracy error of the implemented symbol alignment algorithm and/or the precision error due to the limited sample rate.

In one scheme to eliminate or reduce Δsym-align, the transmitter (e.g., at the CO) may record the local time at the start time of transmitting a symbol or a sequence of symbols. At about the same time, the transmitter may also transmit a special or predetermined sine signal. The sine signal and possibly other modulated sine signals may form a symbol impulse signal. The sine signal may have a specified or predetermined phase offset relative to the start of the symbol(s). For example, the phase offset may be equal to about zero degrees (0°). At the receiver side (e.g., the CPE), the start point of the symbol may be determined by a symbol alignment algorithm in an initialization process and the corresponding real time is stamped. As described above, this timestamp may have a symbol alignment error. Thus, the nearest about 0° phase point on the special sine signal from the time stamped point may be determined. This may provide the offset between the 0° phase point and the start point of the symbol. The offset may be used to correct the receiver timestamp. If the offset is smaller than one circle (e.g., 360°) of the sine signal, the symbol alignment error may be corrected easily. A Fast Fourier Transform (FFT) or a correlation algorithm may be used to find the 0° phase point. Since the sample rate is limited, the 0° phase point may not be a real point in the buffer but may be between two adjacent points in the buffer. However, this may be resolved using FFT or other correlation algorithms.

The method described above to correct the timestamp may not be efficient and/or may be difficult to implement for real DSL systems. In DSL systems where multi-frequency signals are used, some simplification due to system conditions under existing noise levels may be exploited. For instance, in a real channel, including an analog circuit(s) and a copper line(s), the phase response may be substantially linear in a certain range of the pass-band, e.g., where multi-frequency signals may have about the same group delay. As such, part of or all of the signals in the frequency range may be used to obtain a delay offset caused by the symbol alignment error. In the initialization process, a frequency domain equalizer (FEQ) algorithm may be implemented to provide the phase offset information that may be caused by symbol alignment error and non-linear frequency response. If a range of frequency is selected where the frequency response is approximately linear, e.g., the signals in this range of frequency have about the same group delay, the group of signals may be used to mitigate the influence of noise, such as due to radio frequency interference (RFI). The FEQ coefficients of the group of signals may be determined and an optimum beeline may be calculated mathematically, e.g., using a least squares method, to approach or match the group of FEQ coefficients. The slope of the beeline may represent the symbol alignment error. If the symbol alignment error is substantially zero or negligible then the slope may be equal to about zero.

Figure 11:
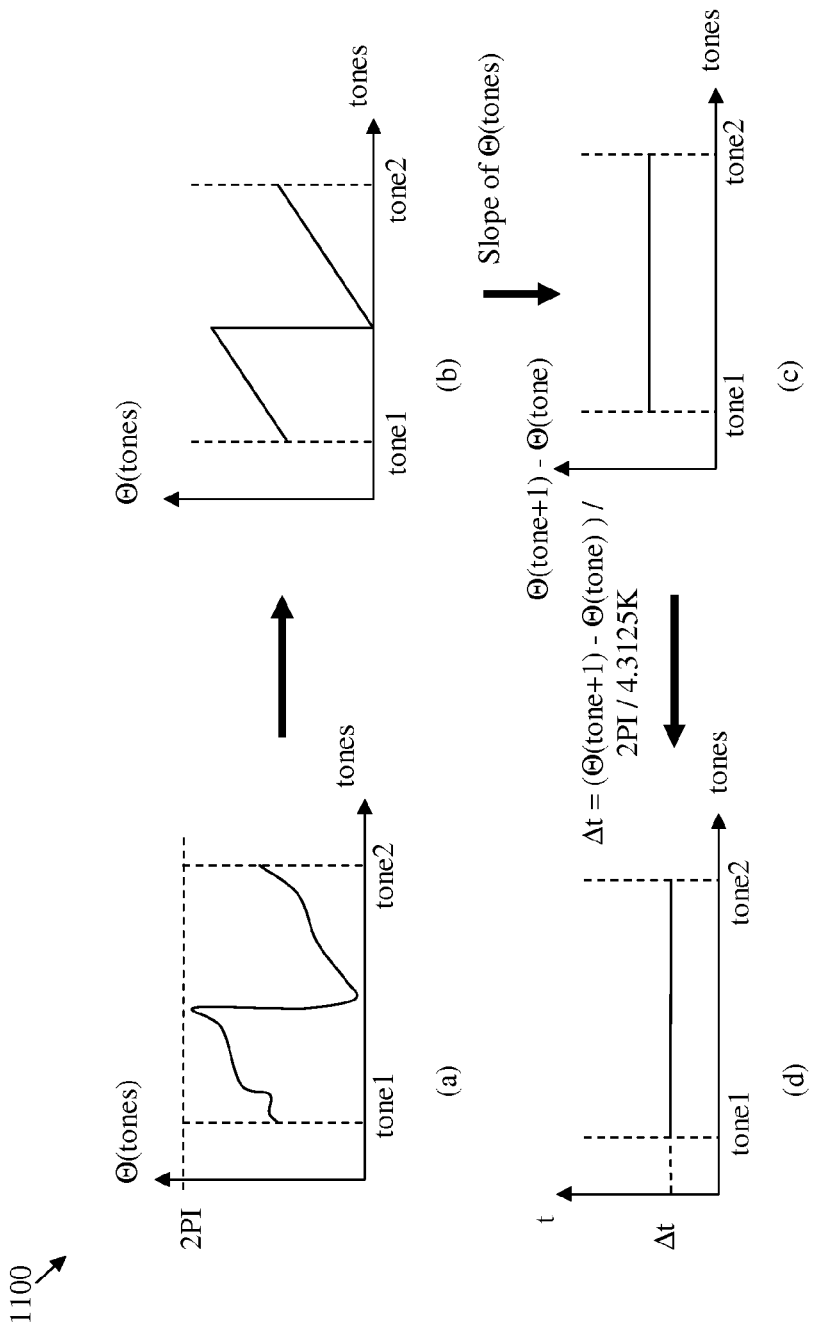
FIG. 11 is a schematic diagram of an embodiment of a symbol alignment error estimation.
Figure 12:
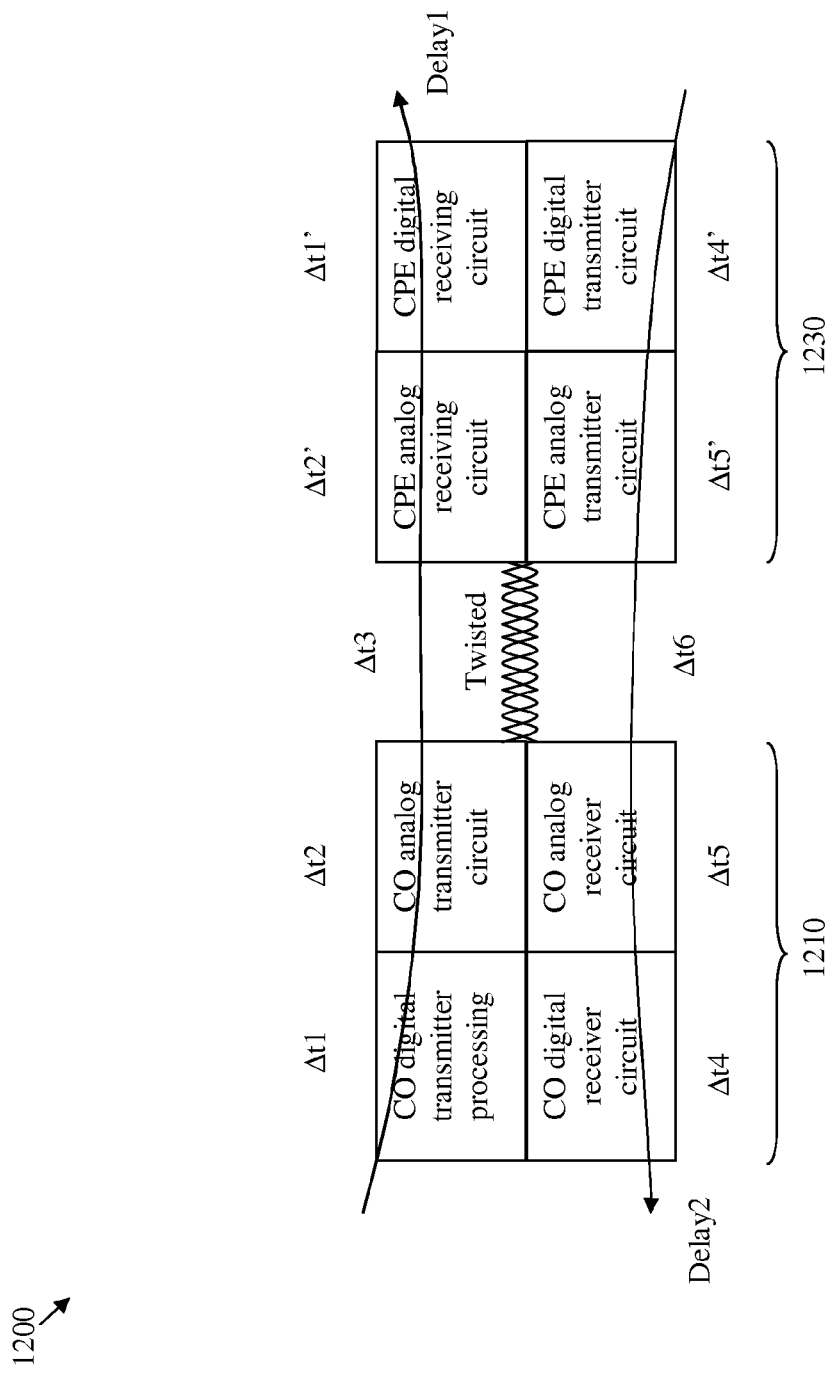
FIG. 12 is a schematic diagram of an embodiment of a twisted-pair propagation delay estimation.

FIG. 11 illustrates an embodiment of a symbol alignment error estimation 1100, which may be implemented by a customer node or CPE. The symbol alignment error estimation 1100 may use a group of tones to correct the timestamp error caused by the symbol alignment error. The function θ(tones) is the phase of a FEQ coefficient. The group tones between tone1 and tone2 is the range of frequencies that have approximately a linear phase variation response, which may be equal to the same delay time. The range of frequencies may be set at a distance substantially far from the stop point of the filter in the channel. Sub-graph (a) in FIG. 11 shows the FEQ phase response of a selected range of frequencies, sub-graph (b) shows the linear fitting curve of the FEQ phase response in sub-graph (a), and sub-graph c shows the slope of the linear fitting curve in sub-graph (b). Sub-graph (d) shows the symbol alignment error that is obtained from sub-graph (c), as indicated by the corresponding arrow line. The symbol alignment error estimation 1100 may use the value ΔT (obtained in sub-graph(c)) to correct a timestamp parameter, Ts1, or another timestamp parameter, Tm2, as described further below. Delay 1 represents a processing time delay between receiving a symbol at the CPE 1230 and transmitting the symbol from the CPE 1230 as depicted in FIG. 12. Delay 2 represents a processing time delay between receiving a symbol at the CO 1210 and transmitting the symbol from the CO 1210 as depicted in FIG. 12.

Figure 13:
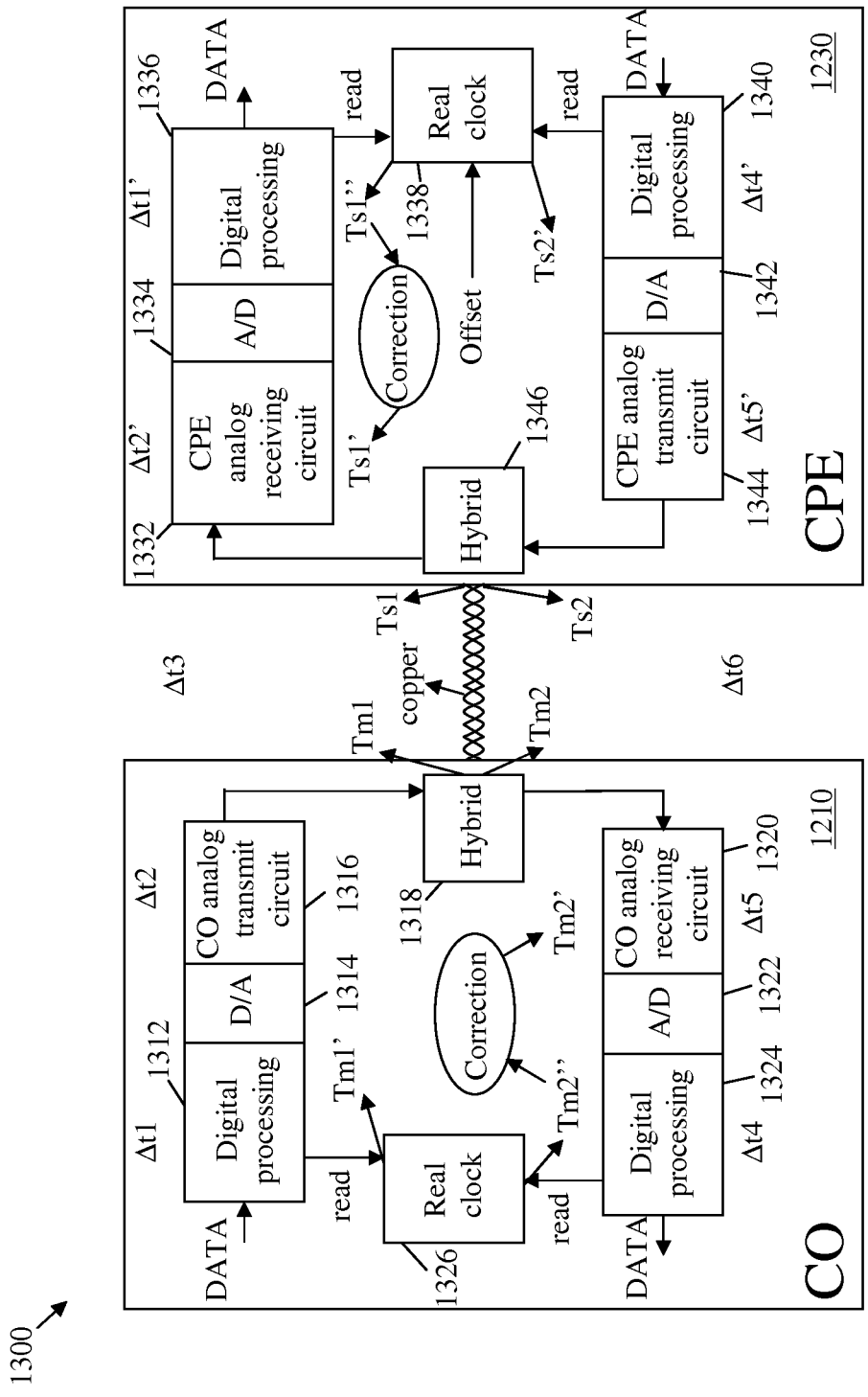
FIG. 13 is another schematic diagram of a twisted-pair propagation delay estimation of FIG. 12.

FIGS. 12 and 13 illustrate an embodiment of a twisted-pair propagation delay estimation 1200, which may be implemented at a CO and/or CPE. FIG. 12 shows the delay composition of a DSL link between a CO 1210 and a CPE 1230. Parameters Δt1 and Δt1' represent a CO digital processing or transmitting time delay and a CPE digital processing or receiving time delay, respectively. These parameters are fixed parameters associated with the equipment in the CO 1210 and CPE 1230. The values may be obtained via testing and then saved as fixed system parameters. Parameters Δt2 and Δt2' represent a CO transmitting analog circuit time delay and a CPE receiving analog circuit time delay. Parameters Δt2 and Δt2' may be relatively fixed and may be obtained via simulation. These parameters may also be tested, e.g., during system assembly phase or before system deployment. The Parameter Δt3 represents a delay of a down-stream signal through the copper line. Since, the lengths of copper lines may vary from hundreds to thousands of meters, the signal time delay Δt3 may not be evaluated with sufficient precision via standard or current testing techniques.

Parameters Δt4 and Δt4' represent a CO digital processing or receiving time delay and a CPE digital processing or transmitting time delay, respectively. These parameters are fixed parameters associated with the equipment in the CO 1210 and CPE 1230. The values may be obtained via testing and then saved as fixed system parameters. Parameters Δt5 and Δt5' represent a CO receiving analog circuit time delay and a CPE transmitting analog circuit time delay, respectively. Parameters Δt5 and Δt5' may be relatively fixed and may be obtained via simulation. These parameters may also be tested, e.g., during system assembly phase or before system deployment. Parameter Δt6 represent a time delay of an up-stream signal through the copper line. Since, the lengths of copper lines may vary from hundreds to thousands of meters, the signal time delay Δt6 may not be evaluated with sufficient precision via standard or current testing techniques.

As shown in FIG. 13, an offset for the downstream direction between the CO 1210 and the CPE 1230 may be obtained based on a timestamp Tm1 at the CO 1210 and another timestamp Ts1 at the CPE 1230. Specifically, at the CO 1210 side, when the first sample of the symbol of time domain data is transmitted, a CO real clock 1326 may be triggered to read the real time for transmitting the symbol. The symbol may be transmitted via a digital processing unit 1326, a digital to analog (D/A) converter 1314, a CO analog transmit circuit 1316, and a CO hybrid circuit 1318 coupled to a twisted copper line. Thus, a corresponding timestamp, Tm1', may be stored in memory. The value Tm1' may be corrected to Tm1 by adding the CO digital processing or transmitting time delay $\Delta t1$ and the CO transmitting analog circuit time delay $\Delta t2$, such that Tm1=Tm1'+$\Delta t1$+$\Delta t2$.

At the CPE 1230 side, when the first sample of the symbol is received, a CPE real clock 1338 may be triggered to read the real time for receiving the symbol. The symbol may be received via a CPE hybrid circuit 1346 coupled to the twisted copper line, a CPE analog receiving circuit 1332, an analog to digital (A/D) converter 1334, and a digital processing unit 1336. Thus, a corresponding timestamp, Ts1", may be stored in memory. The position of the first sample of the received symbol may be determined by a symbol alignment function and the symbol alignment error may be corrected as described above. Accordingly, Ts1" may be corrected to Ts1', and Ts1' may be corrected to Ts1 by subtracting the CPE receiving analog circuit time delay $\Delta t2'$ and the CPE digital processing or receiving time delay $\Delta t1'$, such that Ts1=Ts1'−$\Delta t1'$−$\Delta t2'$. Thus, the total offset for the downstream direction may be obtained as follows:

$$\text{Offset}=Ts1-Tm1-\text{Delay}1. \quad (3)$$

An offset for the upstream direction between the CPE 1230 and the CO 1210 may be obtained based on a second timestamp Tm2 at the CO 1210 and another timestamp Ts2 at the CPE 1230. Specifically, at the CPE 1230 side, when the first sample of the symbol of time domain data is returned, the CPE real clock 1338 may be triggered to read the real time for transmitting the symbol. The symbol may be transmitted via a digital processing unit 1340, a D/A converter 1342, a CPE analog transmit circuit 1344, and the CPE hybrid circuit 1346. Thus, a corresponding timestamp, Ts2', may be stored in memory. The value Ts2' may be corrected to Ts2 by adding the CPE digital processing or transmitting time delay $\Delta t4'$ and the CPE transmitting analog circuit time delay $\Delta t5'$, such that Ts2=Ts2'+$\Delta t4'$+$\Delta t5'$.

At the CO 1210 side, when the first sample of the symbol is received, the CO real clock 1326 may be triggered to read the real time for receiving the symbol. The symbol may be received via the CO hybrid circuit 1318, a CO analog receiving circuit 1320, an A/D converter 1322, and a digital processing unit 1324. Thus, a corresponding timestamp, Tm2", may be stored in memory. The position of the first sample of the received symbol may be determined by a symbol alignment function and the symbol alignment error may be corrected as described above. Accordingly, Tm2" may be corrected to Tm2', and Tm2' may be corrected to Tm2 by subtracting the CO receiving analog circuit time delay $\Delta t5$ and the CO digital processing or receiving time delay $\Delta t4$, such that Tm2=Tm2'−$\Delta t4$−$\Delta t5$. Thus, the total offset for the upstream direction may be obtained as follows:

$$\text{Offset}=Ts2-Tm2-\text{Delay}2. \quad (4)$$

In the case where $\Delta t3$=Delay1=Delay2=$\Delta t6$, the offset and time delay between the CPE real clock time and the CO real clock time may be obtained as follows:

$$\text{Offset}=((Ts2+Ts1)-(Tm2+Tm1))/2, \text{ and}$$

$$\text{Delay}=((Ts1-Ts2)-(Tm1-Tm2))/2.$$

The offset value above may be used to correct the CPE real clock to the CO real clock. The time delays above including $\Delta t1$, $\Delta t1'$, $\Delta t4$, and $\Delta t4'$ may be calculated into the normal digital logic circuit delay, e.g., the memory write delay or the buffer read delay. The reference sample point for transmission from the CO 1210 to the CPE 1230 may have a cost time or link delay as follows:

$$L\text{-Delay}=\Delta t1+\Delta t2+\text{Delay}+\Delta t1'+\Delta t2'.$$

The Delay value above and thus the L-Delay value may account for the offset in timing between the CPE real clock 1338 and the CO real clock 1326.

Figure 14:
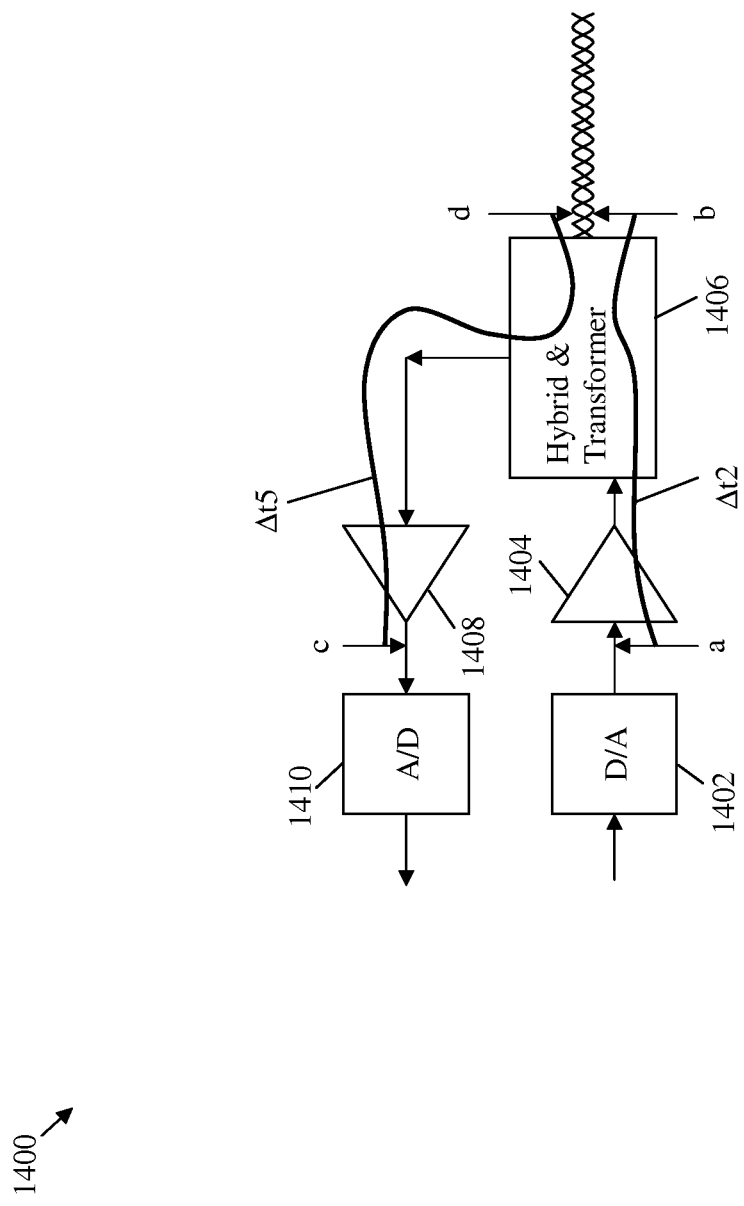
FIG. 14 is a schematic diagram of an embodiment of an analog circuit delay.

FIG. 14 illustrates an embodiment of an analog circuit delay 1400 that may be used to estimate the values of $\Delta t2$ and $\Delta t5$ above at the CO or CO transmitter. The CO or CO transmitter may comprise a D/A converter 1402, an analog filter circuit 1404, a hybrid circuit and transformer 1406, a second analog filter circuit 1408, and an A/D converter 1410, which may be arranged as shown in FIG. 14. $\Delta t2$ represents the delay between a point "a" at the output of the D/A converter 1402 and a point "b" at the start of a twisted copper line or wire coupled to the CO. $\Delta t5$ represents the delay between a point "c" at the start of the twisted copper line and a point "d" at the input of the second analog filter circuit 1408. The circuits between the two points a and b and the two points c and d may be considered in the delay calculation. $\Delta t2$ and $\Delta t5$ may be estimated using software simulations, such as PSPICE simulation or MATLAB simulation. The circuit models in PSPICE or MATLAB may be designed according to the circuits in the CO transmitter, which may vary for different chipset suppliers.

In a PSPICE simulation, different frequency signals may have different delay values, e.g., in the upstream frequency range for signals transmitted via the twisted copper line. Thus, a certain range of frequency signals that have approximately the same delays may be selected. A difference of about 0.5 microsecond between the different frequencies in the selected frequency range may be permitted according to the mobile service time synchronization requirement. In the downstream frequency range for signals received via the twisted copper line, a substantially wide frequency range that has a delay difference less than about 0.5 microsecond may be selected. In PSPICE or MATLAB simulations, the delay of the analog circuit may be obtained by a GROUP DELAY algorithm.

Figure 15:
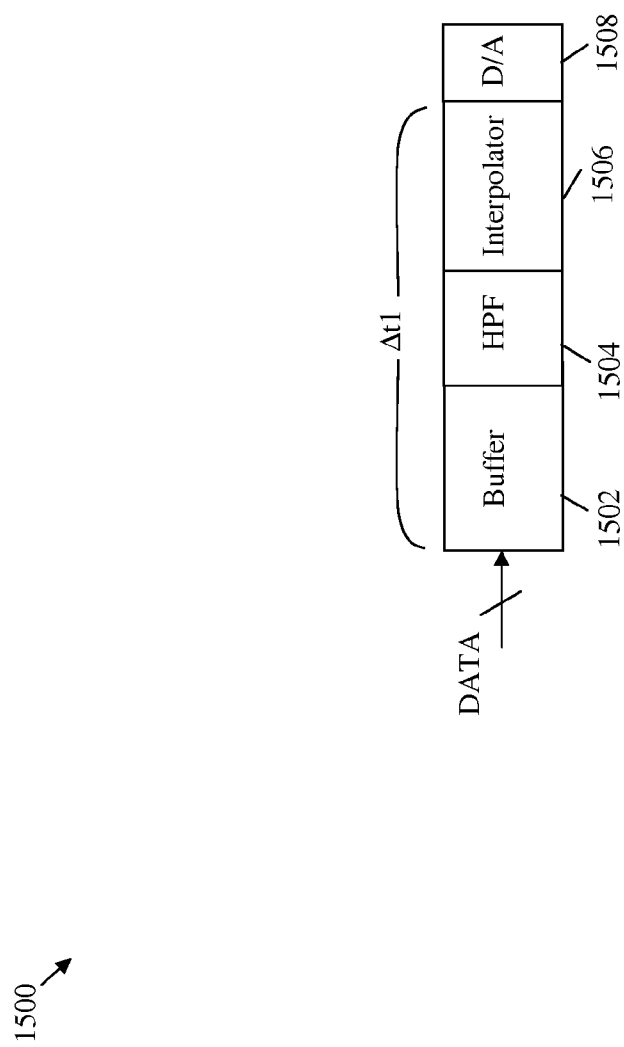
FIG. 15 is a schematic diagram of an embodiment of a digital circuit delay.

FIG. 15 illustrates an embodiment of a digital circuit delay 1500, which may cause time delays in data transmission at a CO or an access node. The digital circuit delay 1500 may correspond to the value $\Delta t1$ above and may comprise a buffer delay 1502, a high band-pass filter (HPF) delay 1504, and an interpolator delay 1506. Timing logic and combinational logic circuit delays (not shown) may also be considered in the calculation of $\Delta t1$. The data transmitted from the CO may be subject to the digital circuit delay 1500 (or the delay value of $\Delta t1$), e.g., in the digital processing unit 1312. The data may subsequently undergo a D/A delay 1508, e.g., in the D/A converter 1314. Values or estimates of $\Delta t1$ and/or the digital circuit delay 1500 may be provided by hardware designers.

Figure 16:
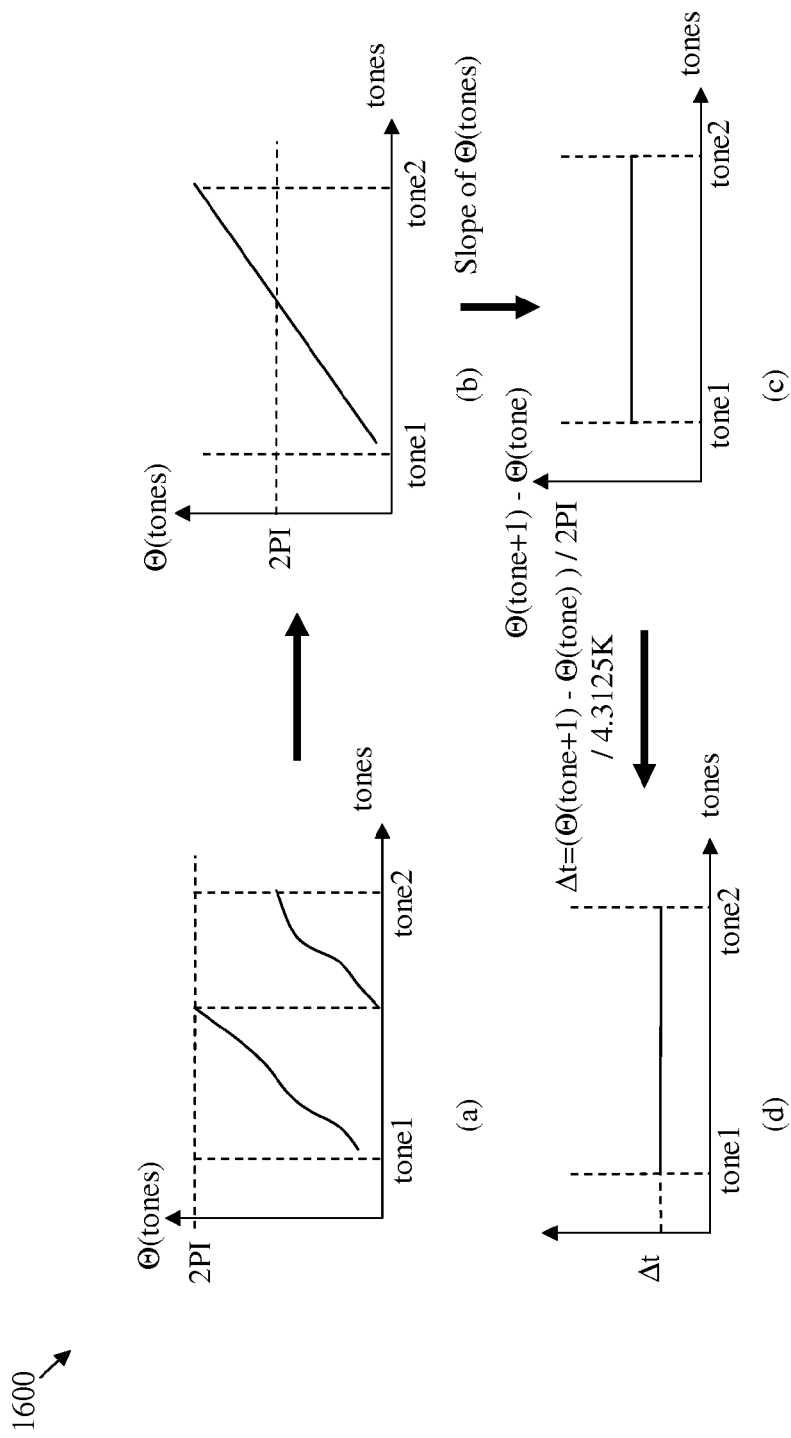
FIG. 16 a schematic diagram of an embodiment of an estimation of the delay of FIR digital circuit.

The HPF delay 1504 and the interpolator delay 1506 above may be based on the design architecture of a finite impulse response (FIR) filter of the CO. FIG. 16 illustrates an estimation of the delay of FIR digital circuit 1600, which may be implemented at an access node or CO using a FIR digital filter delay algorithm to estimate the transmission delay $\Delta t1$ and account for the HPF delay 1504 and the interpolator delay 1506. This delay calculation algorithm may be adapted from or based on a 'Group Delay' algorithm, e.g. using PSPICE or MATLAB simulations. The estimation of the delay of FIR digital circuit 1600 may comprise similar steps as the symbol alignment error estimation 1100 above.

The estimation of the delay of FIR digital circuit 1600 may use a group of tones to correct the timestamp error caused by the transmission delay between the CO and the CPE. The function Θ(tones) is the phase function of HPF and/or interpolator coefficients, which is shown in sub-graph (a). The phase function or curve may not be linear due to noise and/or other non-linearity sources in the system. Sub-graph (b) shows the linear fitting curve of the phase curve in sub-graph (a). Sub-graph c shows the slope of the linear fitting curve in sub-graph (b). Sub-graph (d) shows the HPF/interpolator time delay as obtained from the slope in sub-graph (c), as indicated by the corresponding arrow line. The transmission delay estimation 1600 may be used to obtain the digital signal process circuit delay, Δt, of the HPF digital filter and the interpolator (at the CO). The estimation of the delay of FIR digital circuit 1600 may also account for any timing logic and combinational logic circuit delay (at the CO).

Figure 17:
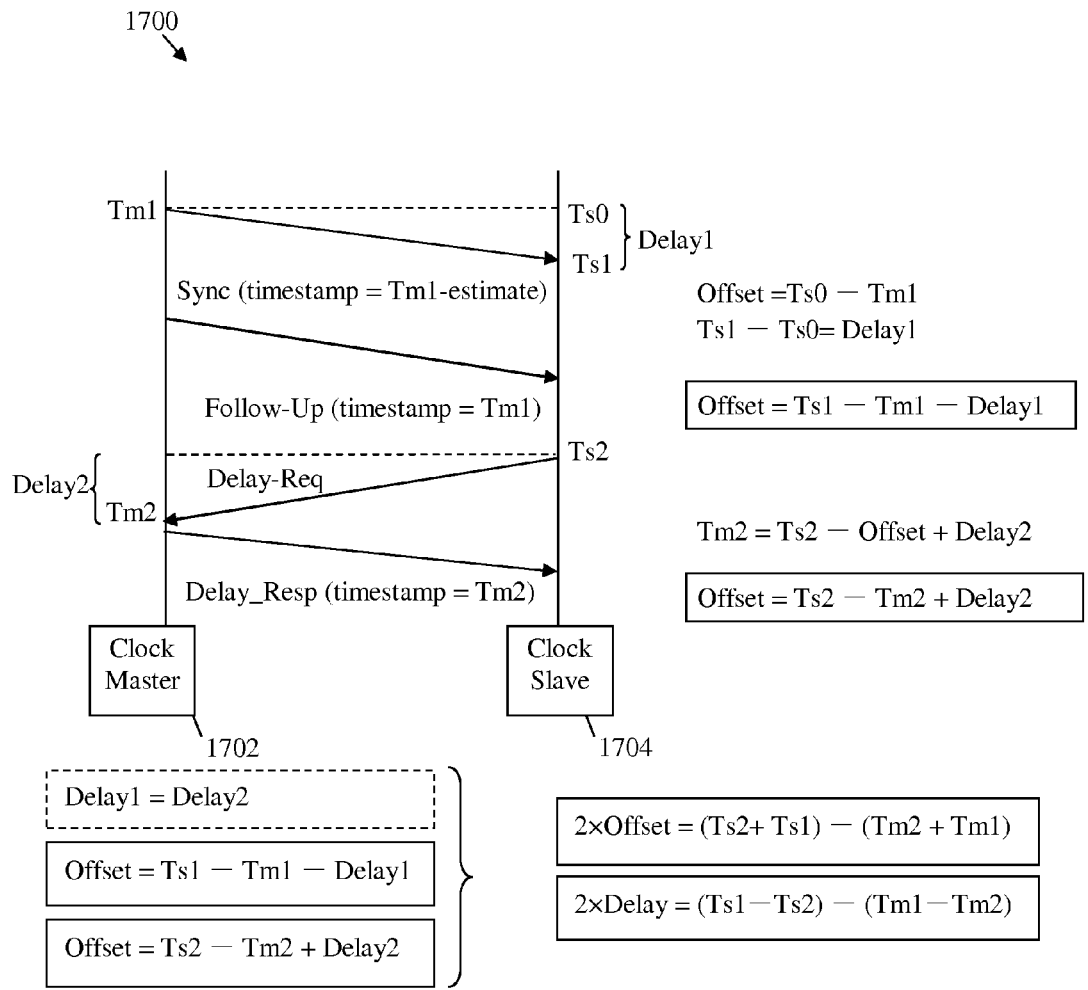
FIG. 17 is a protocol diagram of an embodiment of an accurate time distribution method.

FIG. 17 illustrates an embodiment of an accurate time distribution method 1700, which may be implemented by the CO and the CPE. The accurate time distribution method 1700 may be based on the IEEE 1588 method and may provide microsecond or sub-microsecond accuracy and precision. The method may be based on exchanging a plurality of timestamps between the CO and the CPE, for instance between a master clock 1702 at the CO and a slave clock at the CPE. The timestamps may then be used by the CO and/or the CPE to calculate a clock timing offset error between the CO and CPE and a transmission or link delay between the CO and the CPE.

Initially, at a time Tm1 indicated by the master clock 1702, the CO may send a first timestamp Tm1 to the CPE, which may arrive at the CPE at a time Ts1. The CO may send the first timestamp value Tm1 to the CPE in a synchronization (sync) message. The first timestamp may arrive at the CPE after a first or forward delay, Delay1, from the slave clock 1704 time, Ts0, that corresponds to the same time instance Tm1 of the master clock 1702. The slave clock 1704 time Ts0 may not be equal to or match the master clock 1702 time Tm1 for the same time instance due to mismatch or misalignment between the slave clock 1704 and the master clock 1702. The difference between Ts0 and Tm1 may be referred to as an offset (between the two clocks timing) and the difference between Ts1 and Ts0 may be equal to about Delay1. Thus, the offset may be estimated as Ts1−Tm1−Delay1. The CO may also resend Tm1 to the CPE in a follow up (Follow-Up) message.

Next, at a time Ts2 indicated by the slave clock 1704, the CPE may send a second timestamp Ts2 to the CPE, which may arrive at the CO at a time Tm2. The CPE may send the second timestamp value Ts2 in a delay request (Delay-Req) message. The second timestamp may arrive at the CO after a second or reverse delay, Delay2, from a master clock 1702 time (not shown) that corresponds to the same time instance Ts2 of the slave clock 1404. The difference between that master clock 1702 time for sending the second timestamp and the value Ts2 may be the same offset (between the two clocks) and the difference between Tm2 and the master clock 1702 time for sending the second timestamp may be equal to about Delay2. Thus, the offset may also be estimated as Ts2−Tm2−Delay2. The two equations above for estimating the offset may be simplified in the case Delay1 and Delay2 are substantially equal, e.g., based on a symmetric delay assumption on the forward and reverse (or upstream and downstream) directions or paths between the CO and the CPE. In this case, the offset may be obtained as equal to about half of (Ts2+TS1)−(Tm2+Tm1). The symmetric one way delay may also be obtained as equal to about half (Ts1−TS2)−(Tm1−Tm2).

Figure 18:
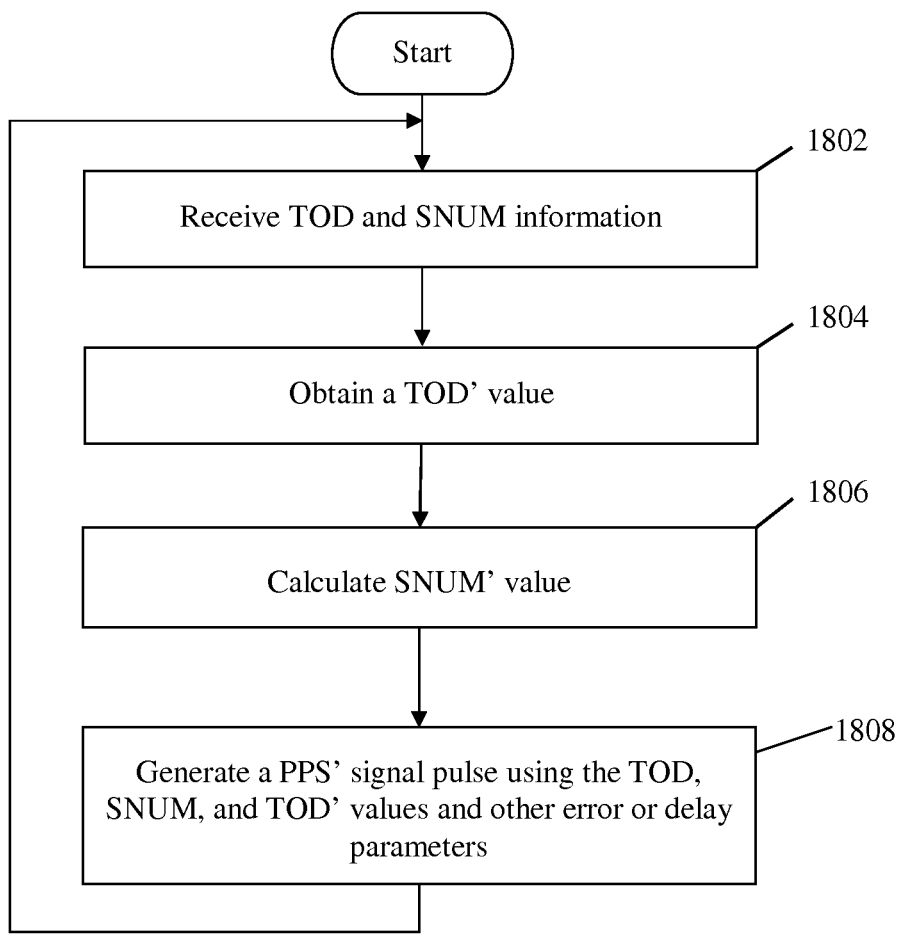
FIG. 18 is a flowchart of an embodiment of an accurate time distribution method.

FIG. 18 illustrates an embodiment of an accurate time distribution method 1800, which may be implemented at a customer node or CPE. The accurate time distribution method 1800 may start at block 1802, where a TOD and SNUM information may be received. The TOD and SUM information may be sent from an access node or CO coupled to the CPE, e.g. via an EOC channel. The TOD and SNUM information may correspond to a PPS value or signal at the CO. The TOD may indicate a time instance for triggering a SNUM value that is associated with a PPS value or pulse at the CO. For instance, when a PPS signal pulse that represents an integer second event occurs at the CO, the CO may record a signal samples index value, e.g., the SNUM value at the time TOD.

At block 1804, a TOD' value may be obtained. The TOD' value may be calculated at the CPE using the received TOD and SNUM information and by accounting for the transmission or link delay (through EOC channel). The link delay may be considered to allow sufficient error margin in the calculations. At block 1806, the SNUM' value may be calculated using the TOD, SNUM, and TOD' values and other error or delay parameters, as described above. For instance, the SNUM' value may be estimated using equation (1). At block 1808, a PPS' signal pulse may be generated upon obtaining the SNUM' value. The PPS signal pulse may be generated at the time TOD'. The steps above of the accurate time distribution method 1800 may be repeated to generate a plurality of subsequent PPS signal pulses upon obtaining a plurality of subsequent SNUM' values at a plurality of corresponding TOD' values. For instance, every predetermined time interval, e.g., at every about one second, a PPS signal pulse and the corresponding time information (TOD' and SNUM' information) may be successively generated and transmitted at the CPE.

Figure 19:
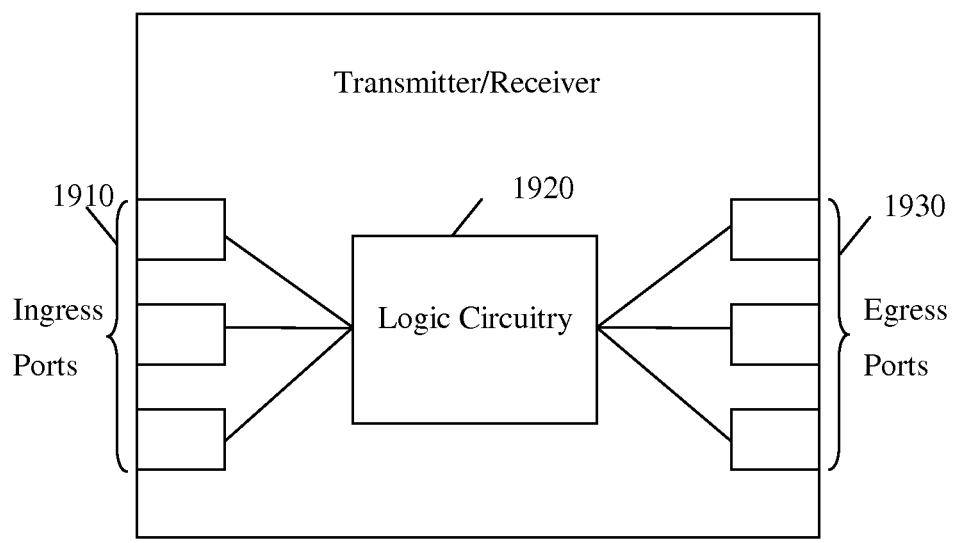
FIG. 19 is a schematic diagram of an embodiment of a transmitter/receiver unit.

FIG. 19 illustrates an embodiment of a transmitter/receiver unit 1900, which may be any device that transports packets through a network. For instance, the transmitter/receiver unit 1900 may be located at a CO or a CPE. The transmitted/receiver unit 1600 may comprise one or more ingress ports or units 1910 for receiving packets, objects, or TLVs from other network components, logic circuitry 1920 to determine which network components to send the packets to, and one or more egress ports or units 1930 for transmitting frames to the other network components.

Figure 20:
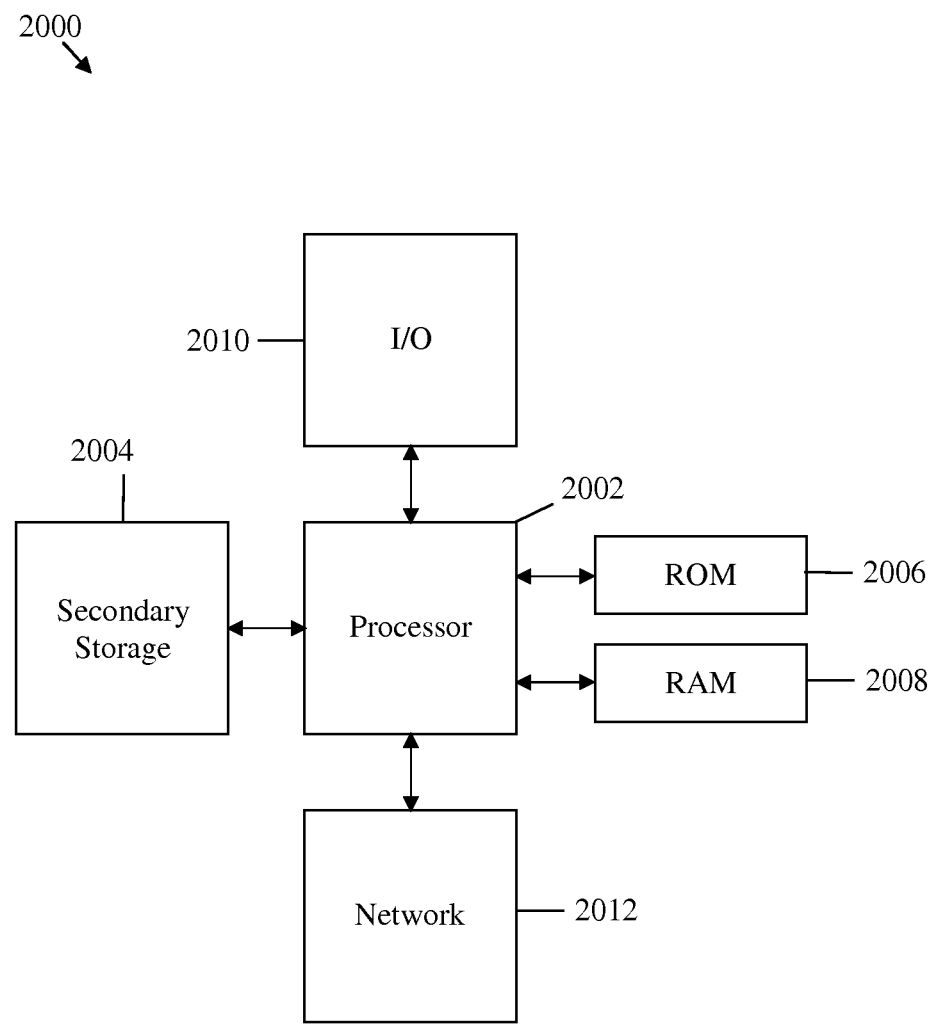
FIG. 20 is a schematic diagram of an embodiment of a general-purpose computer system.

The network components described above may be implemented on any general-purpose network component, such as a computer or network component with sufficient processing power, memory resources, and network throughput capability to handle the necessary workload placed upon it. FIG. 20 illustrates a typical, general-purpose network component 2000 suitable for implementing one or more embodiments of the components disclosed herein. The network component 2000 includes a processor 2002 (which may be referred to as a central processor unit or CPU) that is in communication with memory devices including second storage 2004, read only memory (ROM) 2006, random access memory (RAM) 2008, input/output (I/O) devices 2010, and network connectivity devices 2012. The processor 2002 may be implemented as one or more CPU chips, or may be part of one or more application specific integrated circuits (ASICs).

The second storage 2004 is typically comprised of one or more disk drives or tape drives and is used for non-volatile storage of data and as an over-flow data storage device if RAM 2008 is not large enough to hold all working data. Second storage 2004 may be used to store programs that are loaded into RAM 2008 when such programs are selected for execution. The ROM 2006 is used to store instructions and perhaps data that are read during program execution. ROM 2006 is a non-volatile memory device that typically has a small memory capacity relative to the larger memory capacity of second storage 2004. The RAM 2008 is used to store volatile data and perhaps to store instructions. Access to both ROM 2006 and RAM 2008 is typically faster than to second storage 2004.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 7 percent, ..., 70 percent, 71 percent, 72 percent, ..., 97 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. An apparatus comprising:
   a customer node coupled to an access node and configured to:
   receive via a channel from the access node a time of day (TOD) value and a corresponding sample index (SNUM) value,
   determine a second time of day (TOD') value based on the TOD value, the SNUM value, and on a propagation delay of the channel (L-Delay), and
   determine a second sample index (SNUM') value based the TOD value, the TOD' value, the L-Delay, and a plurality of parameters,
   wherein the SNUM value represents a count of a number of sample data that have been transmitted when a pulse per second (PPS) is detected.

2. The apparatus of claim 1, wherein the parameters comprise a sampling clock time interval and a symbol alignment error, wherein the sampling clock time interval indicates a sampling clock period, wherein the symbol alignment error indicates a phase offset of a received symbol, and wherein the channel is a non-symmetric channel that has different transmission delays in the forward and reverse path directions.

3. The apparatus of claim 1, wherein the access node is located at a digital subscriber line (DSL) central office (CO), wherein the customer node is a customer premise equipment (CPE) that is coupled to the CO via a twisted copper line, and wherein the channel is an Embedded Operations Channel (EOC).

4. The apparatus of claim 1, wherein the customer node comprises at least one of a Sync Symbol Counter (SSCLK), a Symbol Counter (SCLK), and a Sample Counter (CLK) that are used to record the SNUM' value.

5. The apparatus of claim 1, wherein the customer node comprises a splitter configured to receive a pulse per second (PPS) with TOD signal from the access node and split the PPS with TOD signal into two parallel PPS and TOD signals.

6. The apparatus of claim 1, wherein the customer node comprises a local clock and a plurality of data processing circuits, wherein the data processing circuits introduce time delays as part of the L-Delay, and wherein the local clock has a timing offset with a second clock at the customer node that is also a part of the L-Delay.

7. A network component comprising:
   a counter configured to provide a sample index (SNUM) value that corresponds to a pulse of a pulse per second (PPS) signal;
   a clock configured to provide a time of day (TOD) value that indicates a time instant and when a signal is transmitted at a reference point; and
   a transmitter configured to transmit the SNUM value and the TOD value on a twisted copper line,
   wherein the SNUM value represents a count value from the counter when the PPS signal is detected.

8. The network component of claim 7, wherein the counter comprises at least one of a Sync Symbol Counter (SSCLK), a Symbol Counter (SCLK), and a Sample Counter (CLK) that are used to record the SNUM' value that provides the SNUM value that corresponds to the pulse of the PPS signal, and wherein the count value represents a number of sample data transmitted by the network component.

9. The network component of claim 7, wherein the counter is further configured to count a plurality of adjacent pulses of the PPS signal to obtain a substantially accurate sampling clock frequency (Fs) or period (Ts), and wherein the transmitter transmits one of the Fs and Ts to a customer node via the twisted copper line.

10. The network component of claim 7 further comprising a plurality of circuits for transmitting, receiving, and processing data that introduce circuit time delays, and wherein the circuit time delay comprises a high band-pass filter (HPF) delay and an interpolator time delay that are accounted for by a finite impulse response (FIR) digital filter algorithm.

11. The network component of claim 7, wherein the PPS signal is a 1PPS with TOD signal that comprises a PPS segment, a waiting segment, a serial information segment, and an idle segment.

12. The network component of claim 7 further comprising an analog circuit and a hybrid and transformer that introduce a time delay, and wherein the time delay is estimated using a group delay algorithm.

13. A method comprising:
receiving a time of day (TOD) value and a corresponding sample index (SNUM) value;
obtaining a second TOD (TOD') value based on the TOD value, the SNUM value, and a propagation delay;
obtaining a second sample index (SNUM') value based on the TOD value, the TOD' value, and a plurality of transmission parameters; and
generating a pulse per second (PPS') signal pulse using an adjusted clock based on the TOD' value and the SNUM' value,
wherein the SNUM value represents a count of a number of sample data that have been transmitted when a pulse per second (PPS) is detected within an access node.

14. The method of claim 13, wherein a plurality of PPS' signal pulses that form a PPS signal are generated based on the adjusted clock using a plurality of obtained SNUM' and TOD' values from a plurality of subsequently received TOD and SNUM values, and wherein the PPS signal is used to synchronize or distribute time substantially accurately with a network node.

15. The method of claim 13, wherein the SNUM' value is estimated as follows:

$$SNUM+(TOD'-TOD-L\text{-}Delay-(\Delta sym\text{-}align)/Ts,$$

where L-Delay is a link delay with a network node due to delays in analog and digital circuits, clock timing offset, and copper line delay, $\Delta sym$-align is a symbol alignment error due to limited sample rate and symbol alignment algorithm error, and Ts is a time interval between successive PPS' signal pulses.

16. The method of claim 13, wherein estimating the SNUM' using TOD, SNUM, TOD', L-Delay, $\Delta sym$-align, and Ts reduces degradation in time distribution due to channel or propagation delay, deviation of sampling clock frequency, and symbol alignment error.

17. The method of claim 14, wherein L-Delay is estimated assuming a symmetric link delay as follows:

$$L\text{-}Delay=\Delta t1+\Delta t2+((Ts1-Ts2)-(Tm1-Tm2))/2)+\Delta t1'+\Delta t2',$$

where $\Delta t1$ is a central office (CO) digital transmitting time delay, $\Delta t2$ is a CO transmitting analog circuit time delay, $\Delta t1'$ is a customer premise equipment (CPE) digital processing or receiving time delay, $\Delta t2'$ is a CPE receiving analog circuit time delay, Tm1 is a corrected timestamp that indicates a transmission time of a symbol from the CO, Ts1 is a corrected timestamp that indicates an arrival of the symbol at the CPE, Ts2 is a corrected timestamp that indicates a return of the symbol from the CPE, and Tm2 is a corrected timestamp that indicates an arrival of the returned symbol at the CO.

18. The method of claim 15, wherein L-Delay is estimated assuming a symmetric link delay as follows:

$$L\text{-}Delay=\Delta t1+\Delta t2+((Ts1-Ts2)-(Tm1-Tm2))/2)+\Delta t1'+\Delta t2',$$

where $\Delta t1$ is a central office (CO) digital transmitting time delay, $\Delta t2$ is a CO transmitting analog circuit time delay, $\Delta t1'$ is a customer premise equipment (CPE) digital processing or receiving time delay, $\Delta t2'$ is a CPE receiving analog circuit time delay, Tm1 is a corrected timestamp that indicates a transmission time of a symbol from the CO, Ts1 is a corrected timestamp that indicates an arrival of the symbol at the CPE, Ts2 is a corrected timestamp that indicates a return of the symbol from the CPE, and Tm2 is a corrected timestamp that indicates an arrival of the returned symbol at the CO.

19. The method of claim 17, wherein Ts1, Ts2, Tm1, and/or Tm2 are corrected by an offset value using a group of tones that have about a linear phase variation response by obtaining a linear fit for a phase response curve for a high band-pass filter (HPF)/interpolator coefficients of the group of tones, calculating a slope for the linear fit, and calculating a correction value $\Delta T$ based on the slope to correct for $\Delta sym$-align.

20. The method of claim 18, wherein Ts1, Ts2, Tm1, and/or Tm2 are corrected by an offset value using a group of tones that have about a linear phase variation response by obtaining a linear fit for a phase response curve for a high band-pass filter (HPF)/interpolator coefficients of the group of tones, calculating a slope for the linear fit, and calculating a correction value $\Delta T$ based on the slope to correct for $\Delta sym$-align.

21. The method of claim 14, wherein $\Delta sym$-align is corrected using a group of tones that have about a linear phase variation response by obtaining a linear fit for a phase response curve for a frequency domain equalizer (FEQ) coefficient of the group of tones, calculating a slope for the linear fit, and calculating a correction value $\Delta T$ based on the slope to correct for $\Delta sym$-align.

22. The method of claim 15, wherein $\Delta sym$-align is corrected using a group of tones that have about a linear phase variation response by obtaining a linear fit for a phase response curve for a frequency domain equalizer (FEQ) coefficient of the group of tones, calculating a slope for the linear fit, and calculating a correction value $\Delta T$ based on the slope to correct for $\Delta sym$-align.

* * * * *

UNITED STATES PATENT AND TRADEMARK OFFICE
CERTIFICATE OF CORRECTION

PATENT NO. : 8,670,439 B2
APPLICATION NO. : 13/175697
DATED : March 11, 2014
INVENTOR(S) : Wei et al.

It is certified that error appears in the above-identified patent and that said Letters Patent is hereby corrected as shown below:

In the Claims:

Column 16/Line 17 should read: "determine a second sample index (SNUM') value based on"

Column 18/Line 36 should read: "tion value $\Delta T$ based on the slope to correct for $\Delta$sym-align."

Column 18/Line 43 should read: "tion value $\Delta T$ based on the slope to correct for $\Delta$sym-align."

Column 18/Line 56 should read: "fit, and calculating a correction value $\Delta T$ based on the slope to"

Signed and Sealed this
Twenty-seventh Day of May, 2014

Michelle K. Lee
*Deputy Director of the United States Patent and Trademark Office*